(12) United States Patent
Herron

(10) Patent No.: US 12,700,267 B1
(45) Date of Patent: Aug. 4, 2026

(54) SYSTEM AND METHOD FOR COMMUNICATIONS BETWEEN A VEHICLE ELECTRONIC SYSTEM AND AN ADAS TARGET SYSTEM

(71) Applicant: Opus IVS, Inc., Dexter, MI (US)

(72) Inventor: Brian J. Herron, Dexter, MI (US)

(73) Assignee: Opus IVS, Inc., Dexter, MI (US)

( * ) Notice: Subject to any disclaimer, the term of this patent is extended or adjusted under 35 U.S.C. 154(b) by 120 days.

(21) Appl. No.: 18/497,192

(22) Filed: Oct. 30, 2023

Related U.S. Application Data

(63) Continuation-in-part of application No. 18/495,944, filed on Oct. 27, 2023, which is a continuation-in-part of application No. 17/977,182, filed on Oct. 31, 2022.

(51) Int. Cl.
| | |
|---|---|
| *G07C 5/00* | (2006.01) |
| *B60W 50/02* | (2012.01) |
| *G07C 5/08* | (2006.01) |
| *B60W 50/00* | (2006.01) |

(52) U.S. Cl.
CPC ......... *G07C 5/008* (2013.01); *B60W 50/0205* (2013.01); *G07C 5/0808* (2013.01); *B60W 2050/0083* (2013.01)

(58) Field of Classification Search
CPC ...................................................... G07C 5/008
See application file for complete search history.

(56) References Cited

U.S. PATENT DOCUMENTS

| | | | |
|---|---|---|---|
| 10,152,836 | B2 * | 12/2018 | Rozint ................... G07C 5/008 |
| 10,417,839 | B2 * | 9/2019 | Allen, Jr. ................. G07C 5/08 |

| | | | |
|---|---|---|---|
| 10,489,990 | B2 | 11/2019 | Hokenmaier et al. |
| 11,454,525 | B2 * | 9/2022 | Schwindt .................. G01S 7/40 |
| 11,538,188 | B1 | 12/2022 | Cejka et al. |
| 11,830,301 | B2 | 11/2023 | Rozint |
| 11,835,646 | B2 * | 12/2023 | Jefferies ............... G01B 11/275 |
| 11,921,232 | B2 * | 3/2024 | Vianello ........... G01B 11/2755 |
| 12,211,009 | B2 * | 1/2025 | Kleinhans .............. G06Q 10/20 |
| 12,385,766 | B2 * | 8/2025 | Lawrence ............ G01B 11/272 |
| 12,586,042 | B2 * | 3/2026 | Tran ....................... G06Q 10/20 |
| 2017/0301154 | A1 | 10/2017 | Rozint |
| 2017/0345227 | A1 | 11/2017 | Allen, Jr. et al. |
| 2018/0247277 | A1 | 8/2018 | Livernois |
| 2020/0124447 | A1 | 4/2020 | Schwindt et al. |

(Continued)

*Primary Examiner* — Michael A Berns

(74) *Attorney, Agent, or Firm* — Gardner, Linn, Burkhart & Ondersma LLP

(57) ABSTRACT

A method of performing a vehicle advanced driver assist system (ADAS) calibration service operation with a vehicle diagnostic computer tool that includes positioning a vehicle relative to an ADAS target system for calibrating a vehicle sensor on the vehicle. The ADAS target system is configured to support an ADAS target for use in calibrating the vehicle sensor. The method includes communicatively coupling a vehicle diagnostic computer tool to an electronic system of the vehicle and obtaining with the vehicle diagnostic computer tool vehicle data from the electronic system of the vehicle. ADAS target data is received at the vehicle diagnostic computer tool from the ADAS target system. Lastly, the method includes confirming with the vehicle diagnostic computer tool that the vehicle and ADAS target system are configured for undergoing an ADAS calibration of the vehicle sensor based upon the vehicle data and the ADAS target data.

20 Claims, 11 Drawing Sheets

(56)  References Cited

U.S. PATENT DOCUMENTS

| | | |
|---|---|---|
| 2022/0018935 A1 | 1/2022 | Jefferies et al. |
| 2022/0268885 A1 | 8/2022 | Vianello et al. |
| 2023/0005183 A1* | 1/2023 | Cantadori ............ G07C 5/0808 |
| 2023/0243676 A1 | 8/2023 | Lawrence et al. |
| 2024/0257070 A1* | 8/2024 | Merg ..................... G06Q 10/20 |
| 2024/0288544 A1 | 8/2024 | Mambrilla |
| 2024/0343262 A1 | 10/2024 | Sturgeon et al. |

* cited by examiner

Figure 4:
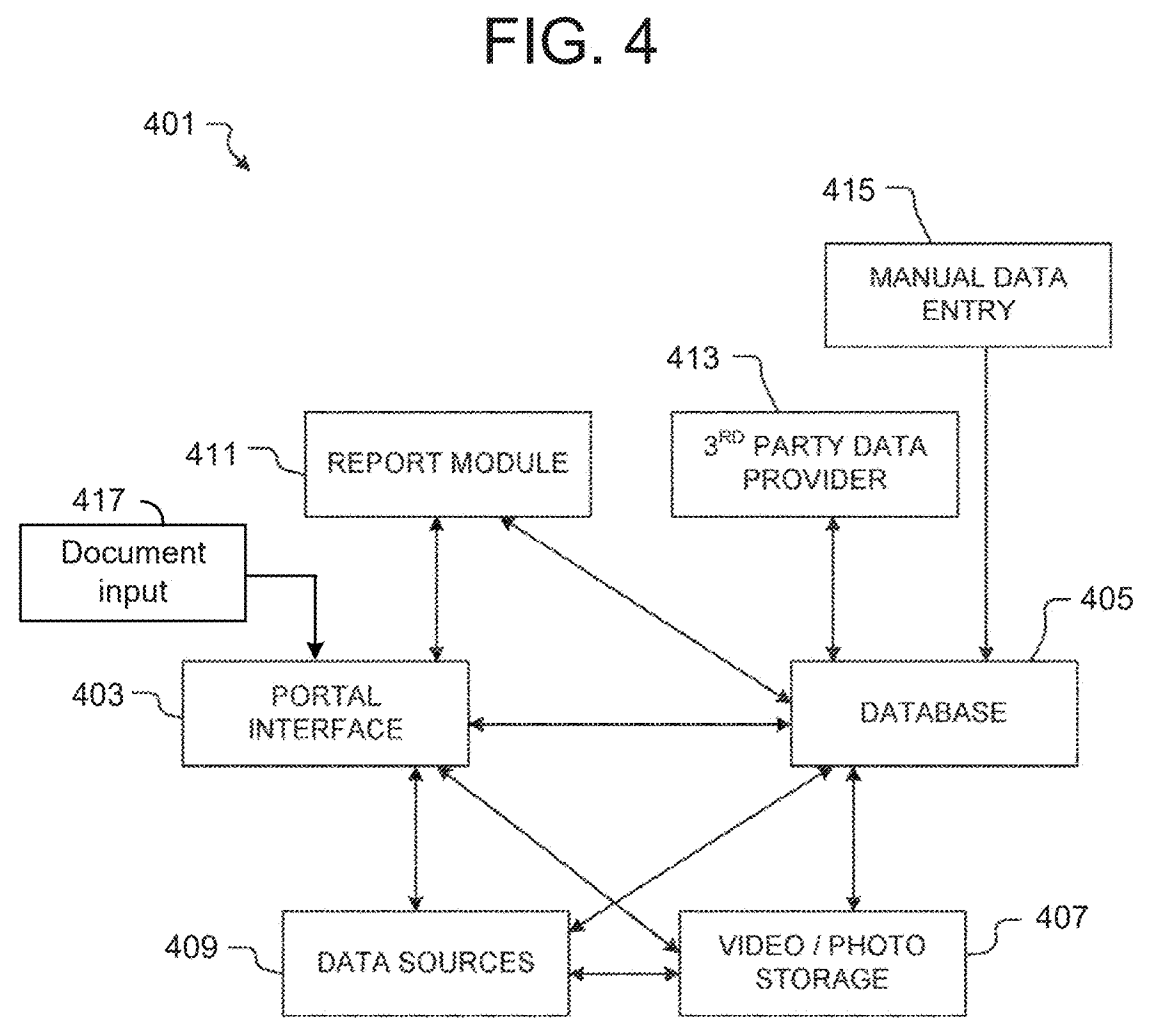

415 — MANUAL DATA ENTRY

413 — 3RD PARTY DATA PROVIDER

405 — DATABASE

407 — VIDEO / PHOTO STORAGE

411 — REPORT MODULE

403 — PORTAL INTERFACE

417 — Document input

409 — DATA SOURCES

Figure 5:
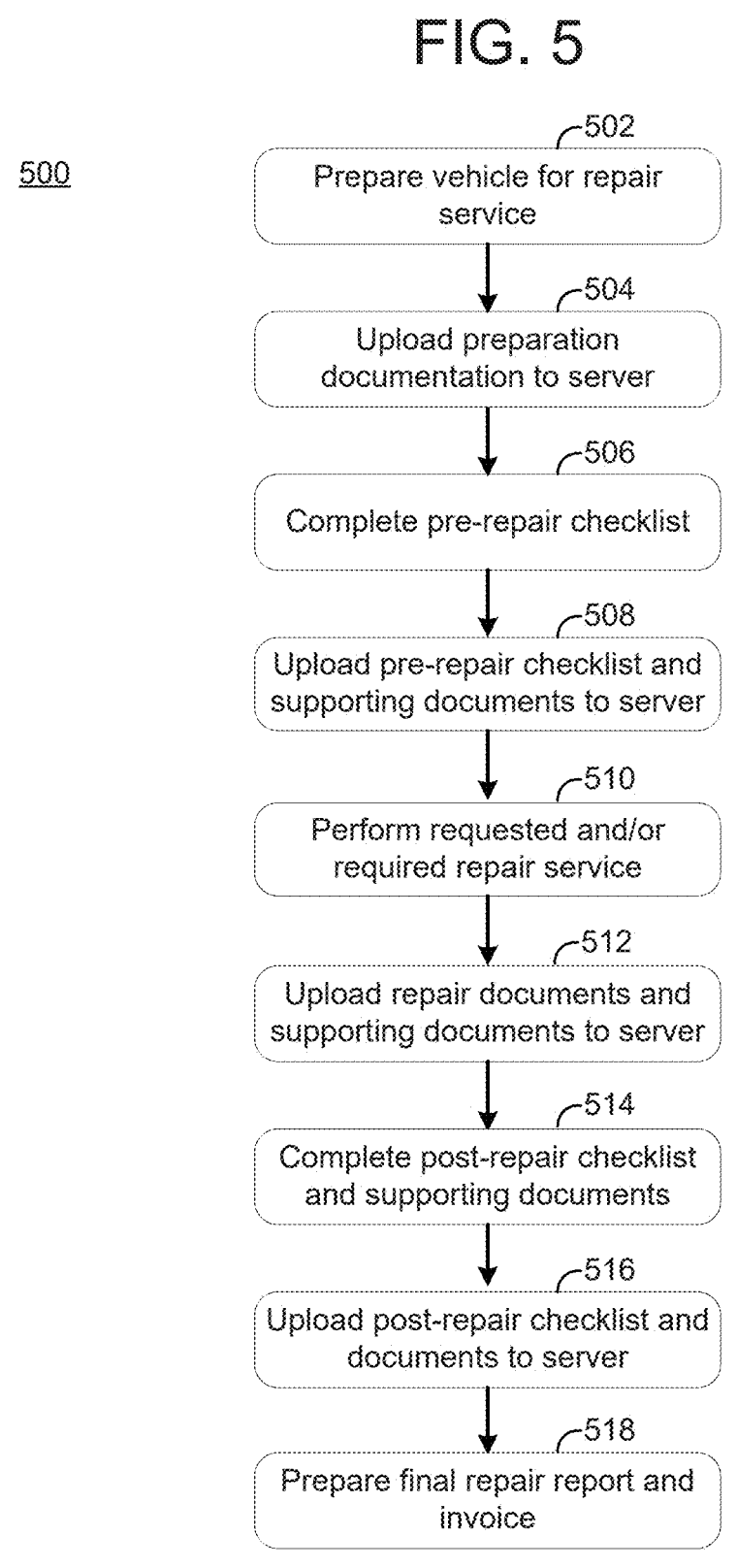

┌─────────────────────────┐ 502
│ Prepare vehicle for repair │
│          service          │
└─────────────────────────┘
            │
            ▼
┌─────────────────────────┐ 504
│    Upload preparation     │
│  documentation to server  │
└─────────────────────────┘
            │
            ▼
┌─────────────────────────┐ 506
│ Complete pre-repair checklist │
└─────────────────────────┘
            │
            ▼
┌─────────────────────────┐ 508
│ Upload pre-repair checklist and │
│ supporting documents to server │
└─────────────────────────┘
            │
            ▼
┌─────────────────────────┐ 510
│   Perform requested and/or   │
│   required repair service   │
└─────────────────────────┘
            │
            ▼
┌─────────────────────────┐ 512
│  Upload repair documents and  │
│ supporting documents to server │
└─────────────────────────┘
            │
            ▼
┌─────────────────────────┐ 514
│ Complete post-repair checklist │
│  and supporting documents  │
└─────────────────────────┘
            │
            ▼
┌─────────────────────────┐ 516
│ Upload post-repair checklist and │
│     documents to server     │
└─────────────────────────┘
            │
            ▼
┌─────────────────────────┐ 518
│ Prepare final repair report and │
│          invoice          │
└─────────────────────────┘

FIG. 7

Diagnostic Tool 150

212

103

220

Object 709

711

710

Fixture/Target 702

702a-c

Fixtures/Targets

712

720

706

708

Camera 704

FIG. 8

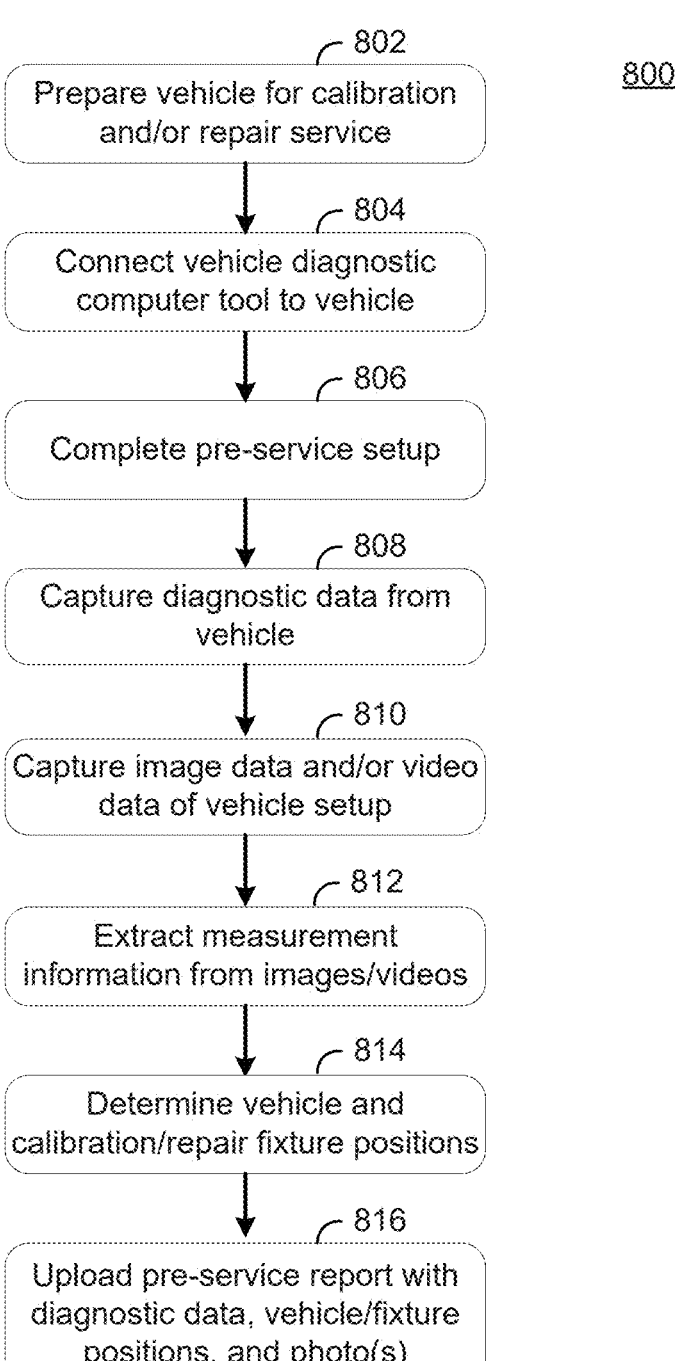

802
Prepare vehicle for calibration and/or repair service

804
Connect vehicle diagnostic computer tool to vehicle

806
Complete pre-service setup

808
Capture diagnostic data from vehicle

810
Capture image data and/or video data of vehicle setup

812
Extract measurement information from images/videos

814
Determine vehicle and calibration/repair fixture positions

816
Upload pre-service report with diagnostic data, vehicle/fixture positions, and photo(s)

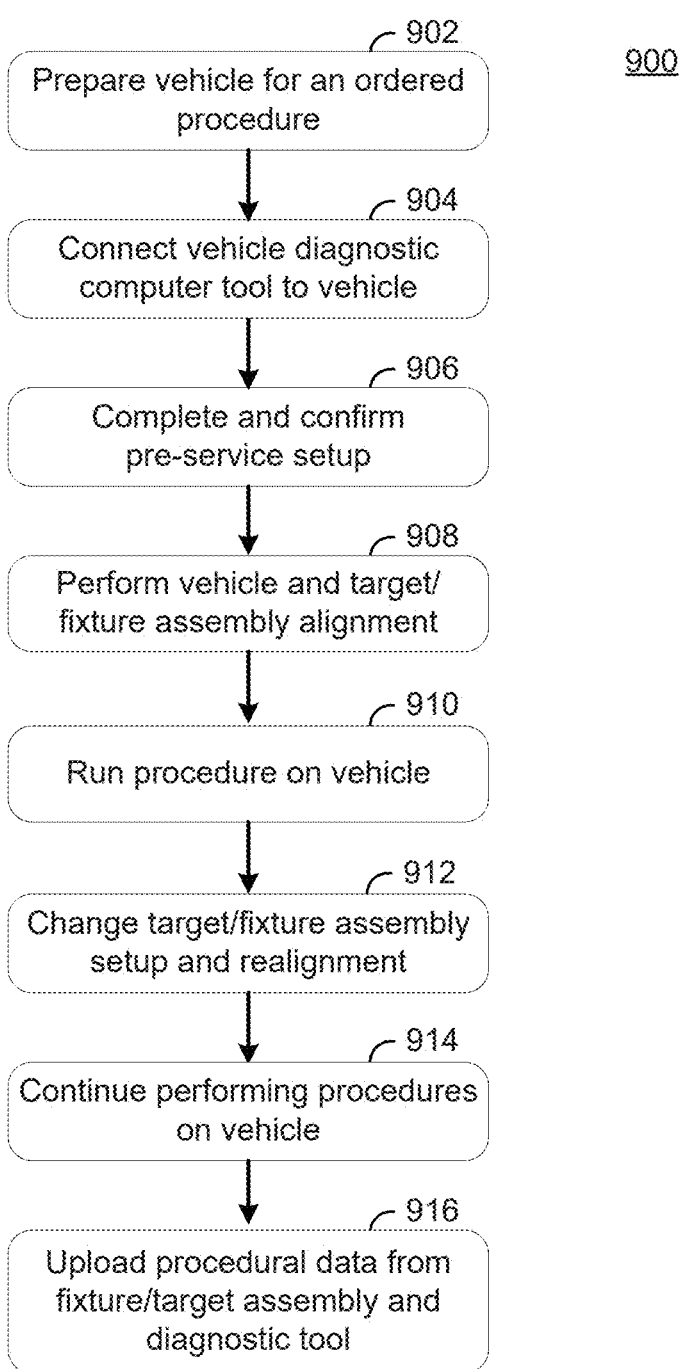

900

902 Prepare vehicle for an ordered procedure

904 Connect vehicle diagnostic computer tool to vehicle

906 Complete and confirm pre-service setup

908 Perform vehicle and target/fixture assembly alignment

910 Run procedure on vehicle

912 Change target/fixture assembly setup and realignment

914 Continue performing procedures on vehicle

916 Upload procedural data from fixture/target assembly and diagnostic tool

FIG. 10

SYSTEM AND METHOD FOR COMMUNICATIONS BETWEEN A VEHICLE ELECTRONIC SYSTEM AND AN ADAS TARGET SYSTEM

CROSS REFERENCE TO RELATED APPLICATIONS

The present application is a continuation-in-part of U.S. patent application Ser. No. 18/495,944, filed Oct. 27, 2023, which is a continuation-in-part of U.S. patent application Ser. No. 17/977,182, filed Oct. 31, 2022, which are both hereby incorporated by reference herein in their entireties.

BACKGROUND OF THE INVENTION

The present invention is directed to automotive service systems, and in particular to documenting repair services performed by one or more service providers through automatically attaching data files related to service on the vehicle to an electronic invoice.

Automotive service systems are well known in the art and are effective means to provide repair, cleaning or maintenance work to a vehicle. For example, after an accident or when the vehicle is not working properly it requires repair. Part of a repair may require verifying that the repair of certain vehicle systems, such as vehicle safety systems, was successful. It may be necessary to perform diagnostic scans and/or vehicle calibrations to ensure that the safety systems of the vehicle operate as designed. This could include sensors, mirrors, alarms cameras or the like.

SUMMARY OF THE INVENTION

The present invention provides a vehicle service system that documents repair services on a vehicle, and in particular automatically attaches documentation data files to an invoice for the repair services for purposes of confirming and validating what services were performed, how they were performed and the results thereof, including for insurance and liability purposes, where the documentation may be generated while the repair services are performed whereby each progressive step of a repair may be documented. In an aspect of the present invention, the vehicle service system further includes the extraction of diagnostic data from a diagnostic tool to document vehicle setup before and during calibration and repair procedures. In a further aspect of the present invention, the documentation of vehicle setup for calibration and repair procedures includes imagery that provide photo distance measurements. In an alternative embodiment, the documentation of calibration and repair procedures includes position and orientation information received from a vehicle advanced driver assist system (ADAS) target system configured to position/orientation sensors. The ADAS target system can also include an ability to identify and/or read a target identity (e.g., part number). Such information can be provided to a diagnostic tool via a communications link between the diagnostic tool and the ADAS target system.

The vehicle service system captures documentation data from a number of sources and automatically attaches the data to an invoice of the vehicle repairs, including documentation data comprising manufacturer repair procedures, manufacturer position papers, images of vehicle damage, images of vehicle repairs, diagnostic test data results, calibration results, and the like. For example, data from the vehicle and/or information from a user or observer may be monitored and captured while the procedural steps of the service are being performed. In addition, the system may capture the documents that were used during the repair services and/or generated during the repair service, such as the repair order, repair instructions, test and calibration results and the like. The vehicle service system may include a vehicle diagnostic computer tool that is in communication with the electronic system of the vehicle. The vehicle diagnostic computer tool monitors and captures repair data that is generated and/or utilized during the repair services, such as, test results, scan results, including OEM diagnostic scans, calibration/alignment reports and/or results. The vehicle service system also provides procedural documentation of the repair service by capturing images of vehicle damage and images of test equipment setups for any necessitated procedures, as well as images captured during one or more procedural steps of the repair service. The vehicle service system's procedural documentation also includes capturing any procedure documents that were retrieved and utilized during the repair, such as, original equipment manufacturer (OEM) repair, alignment, and/or calibration procedures and instructions, OEM diagnostic scan documents and procedures, printed calibration results, and reports that were used to evaluate the vehicle during the service repair. The procedural documents may be selectively retrieved by the diagnostic tool or a computing device based upon vehicle information. Such test data and procedural documentation, which includes captured images and selected procedural documents, are uploaded to a remote computer and used by the service provider and/or an insurer, etc. to document that a repair or service was necessary and/or mandated by an original equipment manufacturer. The test and/or procedure results, resulting reports, images, and selected documents are used to generate a report documenting the service, and in particular are automatically integrated with the electronic invoice of the services. The vehicle diagnostic computer tool further captures diagnostic data from the vehicle to capture vehicle information related to calibration and repair setup procedures. The vehicle service system also includes a camera configured to capture images for photo distance measurement of target and/or fixture setup and positioning before vehicle calibration (e.g., targets and/or fixtures used during ADAS calibration). In an aspect of the present embodiment, the evaluation and documentation of calibration and repair procedures (as specified, for example, by OEM vehicle information and/or aftermarket vehicle information) with respect to position and orientation information received from an ADAS target system (with an equipped position and orientation sensor) is evaluated by the ADAS target system. The ADAS target system can also include an ability to identify and/or read a target identity (e.g., a part number or serial number, and the like). Such information can be provided to a diagnostic tool via a communications link between the diagnostic tool and the ADAS target system. Thus, the setup and alignment of the ADAS target system (and its equipped targets) can be monitored by the diagnostic tool and the ADAS target system to document the setup of the vehicle for the procedure.

In accordance with an aspect of the present invention, a method of performing a vehicle advanced driver assist system (ADAS) calibration service operation with a vehicle diagnostic computer tool that includes positioning a vehicle relative to an ADAS target system for calibrating a vehicle sensor on the vehicle. The ADAS target system is configured to support an ADAS target for use in calibrating the vehicle sensor. The method includes communicatively coupling a vehicle diagnostic computer tool to an electronic system of the vehicle and obtaining with the vehicle diagnostic computer tool vehicle data from the electronic system of the vehicle. ADAS target data is received at the vehicle diagnostic computer tool from the ADAS target system. Lastly, the method includes confirming with the vehicle diagnostic computer tool that the vehicle and ADAS target system are configured for undergoing an ADAS calibration of the vehicle sensor based upon the vehicle data and the ADAS target data.

In accordance with another aspect of the present invention, a vehicle service system for performing a vehicle advanced driver assist system (ADAS) calibration service operation with a vehicle diagnostic computer tool. The system includes an ADAS target system and a vehicle diagnostic computer tool. The ADAS target system is positioned relative to a vehicle for calibrating a vehicle sensor on the vehicle. The ADAS target system is configured to support an ADAS target for use in calibrating the vehicle sensor. The vehicle diagnostic computer tool is communicatively coupled to an electronic system of the vehicle. The vehicle diagnostic computer tool is configured to obtain vehicle data from the electronic system of the vehicle. The vehicle diagnostic computer tool is configured to receive ADAS target data from the ADAS target system. The vehicle diagnostic computer tool is configured to confirm that the vehicle and the ADAS target system are configured for undergoing an ADAS calibration of the vehicle sensor based upon the vehicle data and the ADAS target data.

In accordance with an aspect of the present invention, a method for documenting a calibration and/or repair setup performed on a vehicle includes obtaining electronic documents related to vehicle setup for a calibration and/or repair procedure. The documents define procedures for setting up the vehicle and fixtures and/or targets for the calibration and/or repair procedure. A diagnostic tool is communicatively coupled to an electronic system of the vehicle. The diagnostic tool monitors diagnostic data from the electronic system of the vehicle and captures selected diagnostic data from the vehicle. The method includes confirming based on the selected diagnostic data that the vehicle is configured for undergoing a calibration and/or repair procedure. The method further includes capturing with a camera image data to document vehicle position and/or fixture/target position with respect to each other. A pre-procedure setup report is generated that comprises the selected diagnostic data and the image data to document the vehicle and fixture/target setup procedures.

In accordance with an aspect of the present invention, a method of documenting a repair service performed on a vehicle by a service provider comprises generating an electronic invoice file detailing repair operations specified for repair of a vehicle requiring service at a repair facility, obtaining electronic data files directed to the repair operations on the vehicle, and attaching the electronic data files to the electronic invoice file, wherein the electronic data files comprise repair instructions, images of the vehicle, and/or diagnostic data of an electronic system of the vehicle, and where the electronic data files document the repairs that were performed on the vehicle. In accordance with particular embodiments, the electronic data files are automatically attached to the electronic invoice file.

Electronic data files comprising repair instructions may be obtained from a database of repair instructions for the repair operations that may be remote from the repair facility.

In accordance with a particular aspect of the present invention, the method further comprises providing a vehicle repair estimating software via which the electronic invoice file is generated. The vehicle repair estimating software may be accessible by a computer device of the repair facility.

Still further, the method may further include providing a vehicle diagnostic computer tool that is configured to be connected to a diagnostic port of the vehicle to be in communication with the electronic system of the vehicle, and further comprise obtaining diagnostic data with the vehicle diagnostic computer with the obtained diagnostic data then being attached to the electronic invoice file, such as automatically attached.

The electronic invoice file may be retained in the repair facility computer device, with the method including providing electronic data files to the repair facility computer device for attaching to the electronic invoice file, such as automatically attaching the electronic data files. The electronic data files may be provided from a vehicle diagnostic computer tool and comprise diagnostic data from the electronic system of the vehicle. The electronic data files may alternatively be provided from a camera and comprise digital images of the vehicle. Still further, the electronic data files may be provide from a database and comprise repair instructions.

According to a further aspect of the present invention, a method of monitoring and documenting a repair service performed on a vehicle by a service provider comprises providing a computer device, providing a vehicle diagnostic computer tool configured to communicate with and monitor an electronic system of a vehicle, connecting the vehicle diagnostic computer tool with a diagnostic port of the vehicle to be in communication with the electronic system of the vehicle, and obtaining electronic data files from a database comprising procedural documents for a plurality of procedural steps of the repair service to be performed by the service provider, providing the procedural documents to the computer device. The method further includes monitoring and capturing with the vehicle diagnostic computer tool electronic data files comprising diagnostic data from the electronic system of the vehicle captured during a diagnostic test performed during one of the procedural steps of the repair service, providing the diagnostic data to the computer device, and attaching the procedural documents and the diagnostic data to an electronic invoice retained at the computer device. In a particular embodiment the method further comprises obtaining digital images of the vehicle with a camera, providing the digital images to the computer device, and attaching the digital images to the electronic invoice file.

In accordance with a further aspect of the invention, attaching of the procedural documents, the diagnostic data and/or the digital images to the electronic invoice file is performed automatically. The computer device may be located at a repair facility or remotely, and the data base from which procedural documents are obtained may be a remote database.

These and other objects, advantages, purposes, and features of this invention will become apparent upon review of the following specification in conjunction with the drawings.

BRIEF DESCRIPTION OF THE DRAWINGS

FIG. 4 is an exemplary schematic of the interactions of the vehicle service system of FIG. 1;

FIG. 5 is a flow diagram illustrating steps to a method for monitoring and recording the test data produced during a repair service and the capturing of procedural documentation for the repair service performed on a vehicle in accordance with the present invention;

FIG. 7 is a diagram of an exemplary service system illustrating the documenting of vehicle setup and the use of photo distance measurements in accordance with the present invention;

FIG. 8 is a flow diagram illustrating steps to a method for monitoring diagnostic data from a vehicle to document vehicle setup before calibration and/or repair procedures in accordance with the present invention;

FIG. 9 is a flow diagram illustrating steps to a method for monitoring vehicle data from a vehicle and position/orientation data from an ADAS target system to document vehicle setup before calibration and/or repair procedures in accordance with the present invention; and FIG. 10 is a diagram of an exemplary service system illustrating the documenting of vehicle setup and the use of an ADAS target system outputting position/orientation data in accordance with the present invention.

DESCRIPTION OF THE PREFERRED EMBODIMENTS

The present invention will now be described with reference to the accompanying figures, wherein the numbered elements in the following written description correspond to like-numbered elements in the figures.

Figure 1:
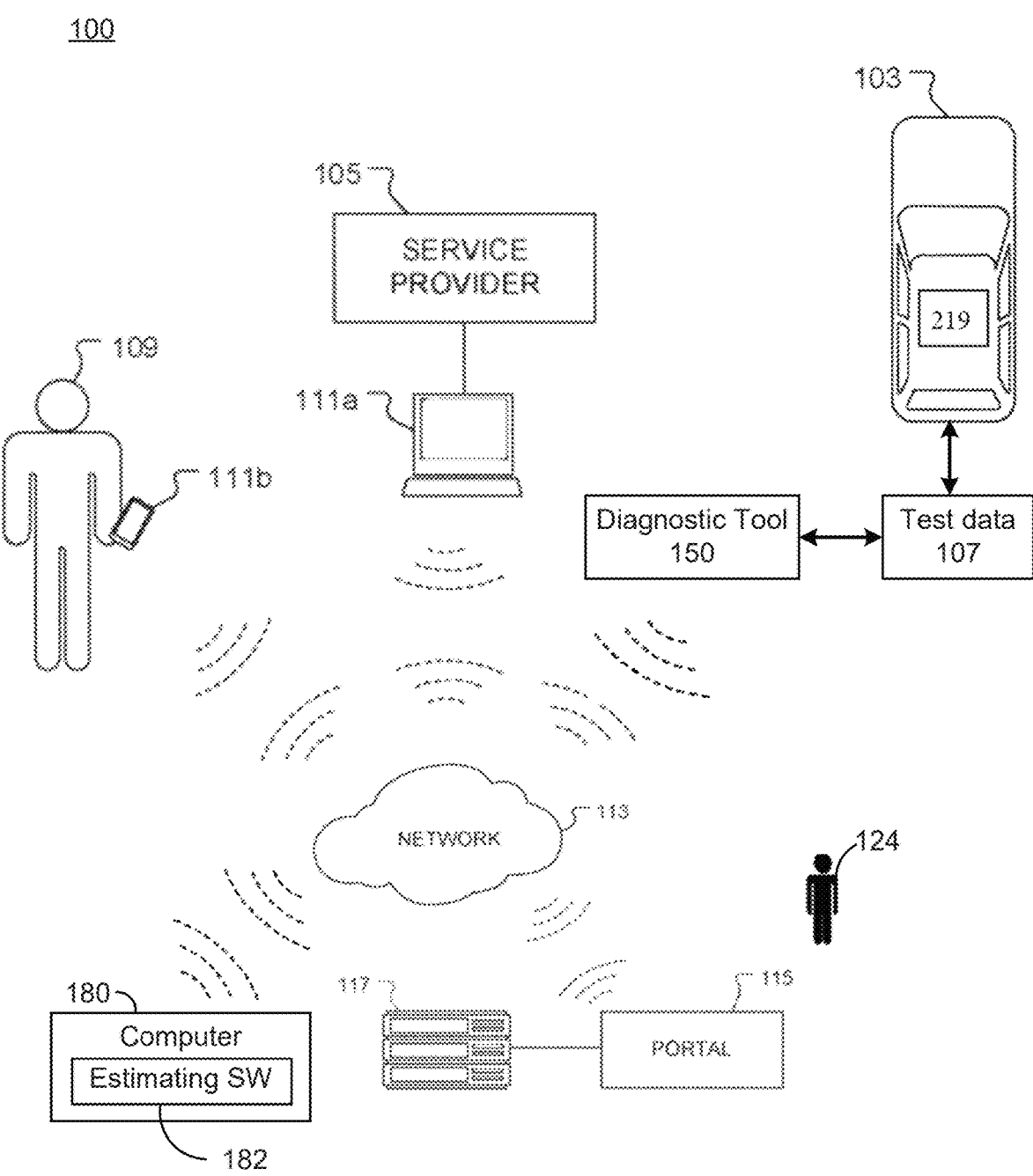
FIG. 1 is a diagram of a vehicle repair service documentation system for automatically documenting repair service information in accordance with the present invention.
Figure 1A:
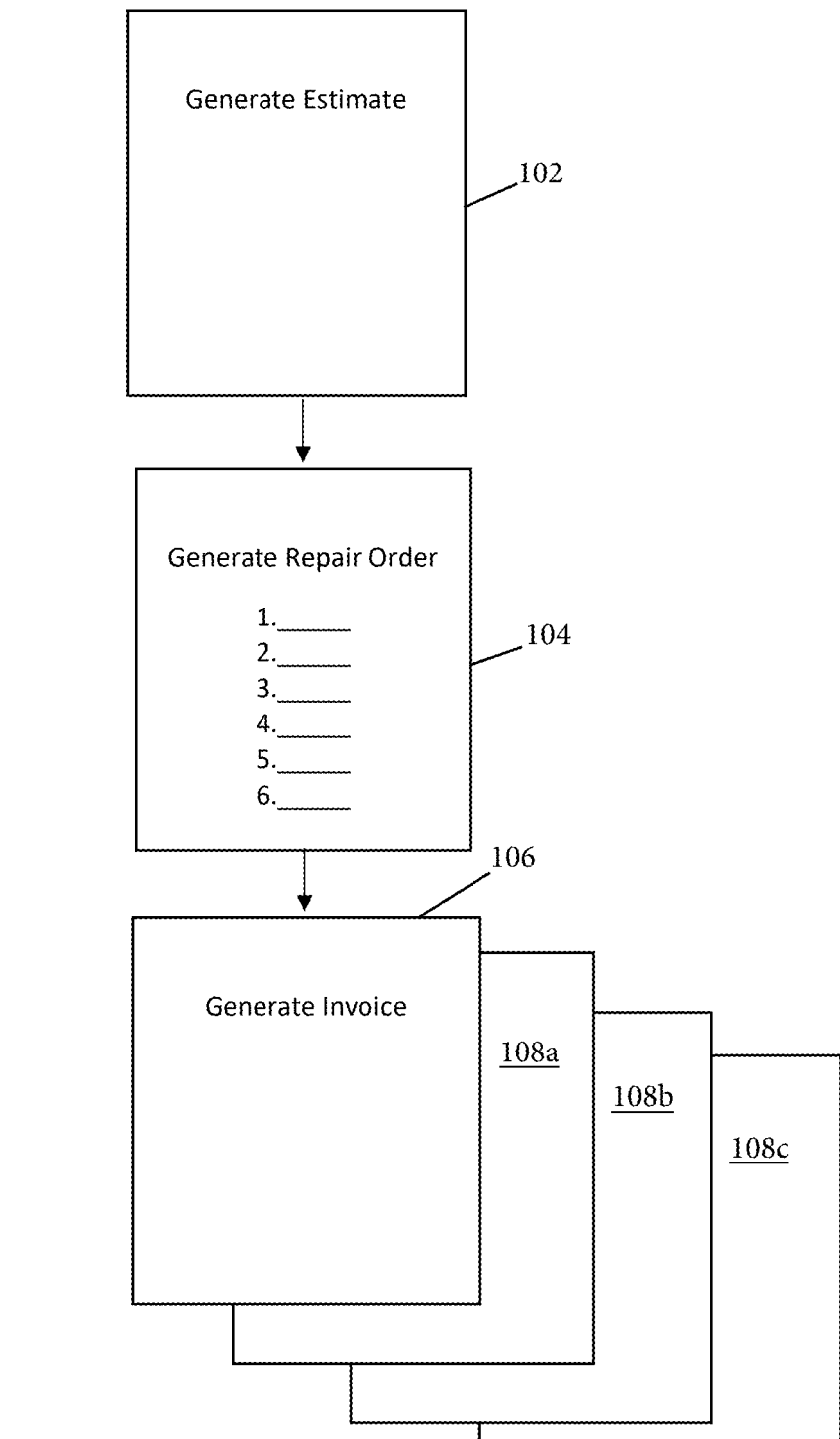
FIG. 1A is a schematic illustration of a service documentation system in accordance with an aspect of the present invention.

Referring to the drawings, an exemplary vehicle repair service documentation system 100 and methods for monitoring and capturing vehicle repair data and selected procedural documents from various sources for a repair service performed on a vehicle are described, where the vehicle repair data is automatically attached to an electronic invoice. With reference to FIG. 1A, and as discussed in more detail below, in an exemplary embodiment an electronic estimate file ("estimate file") 102 may be generated for repair of a vehicle 103 requiring service, such as by an estimating software 182 (FIG. 1). Upon initiating repairs based on the estimate file 102, a repair order 104 may be generated, such as from the estimating software 182, where the repair order 104 comprises an electronic file that details the repair services required for repair of the vehicle 103. An electronic invoice file ("invoice file") 106 is also generated, and in accordance with aspects of the present invention repair service documentation data files (which may be referred to as "documentation data files," "repair service documentation data files," or "data files") 108 (shown as 108a, 108b, 108c in FIG. 1A) are attached so as to be combined or linked to the invoice file 106, where the documentation data files 108 are provided from a number of sources and automatically attached to the invoice file 106 for purposes of confirming and validating what services were performed, how they were performed and the results thereof, including for insurance and liability purposes. The documentation data files 108 may comprise manufacturer repair procedures, manufacturer position papers, images of vehicle damage, images of vehicle repairs, diagnostic test data results, calibration results, and the like. System 100 may be employed across one or more computing, testing and diagnostic devices for generating and obtaining the documentation data files 108. The electronic invoice file 106 with attached repair service documentation data files 108 is retained, such as in a memory of a computing device such as computer 111a and/or 180 and/or in database 117.

In an exemplary embodiment, initial repair service documentation data files 108 that may be obtained comprise manufacturer repair procedures, manufacturer position papers, and other service instructions. System 100 may automatically obtain this information from one or more database via a network 113, such as a database 117 associated with a remote computer or portal 115. System 100 may automatically retrieve such documentation data files 108 based on the repair order 104, which is specifically directed to a particular make, model and year of vehicle as established by the electronic estimate file 102. These repair service documentation data files 108 may then be accessible to a service technician 109, such as via a computing device 109 or via a diagnostic tool 150. It should be understood that while FIG. 1A illustrates three separate documentation data files 108a, 108b, 108c being attached to electronic invoice file 106 that fewer or more than three such files may be attached.

The vehicle service system 100 automatically provides additional vehicle repair data documents 108 during a variety of repair procedures, calibrations, and alignments that may be necessitated for a vehicle with damage, including where services may be provided across multiple service providers. Such exemplary repair services that may be required due to damage, may include, for example, an ADAS safety system repair, replacement, calibration and/or service, body work, pre- and post-service calibration diagnostic scans, test drives, calibration procedures, module programming or reprogramming, air conditioning chemistry recovery and recharging, ADAS camera and radar calibrations, and the like. The vehicle service system captures documentation regarding what services are required, the repair instructions for such services, as well as confirmation of the repairs, including documents on the replacement parts used, as well as testing data (e.g., test results, scan data, which includes OEM diagnostic scans, calibration data, and the like) from the vehicle and/or information from a user or observer while the procedural steps of the service are being performed. The vehicle service system may also capture images of vehicle damage, pre- and post-service images, images of vehicle test and calibration setups, as well as images of procedural documents generated during the repair service (e.g., reports, test results, and other generated documents). As noted, the vehicle service system may also capture procedural documents that were selectively retrieved and utilized during the repair services, such as, original equipment manufacturer (OEM) repair instructions and procedures, OEM alignment and/or calibration procedures and instructions, and OEM diagnostic scan documents and procedures.

As noted, the system 100 is configured to automatically attach documentation data files 108 to an electronic invoice file 102. For example, one or more programs may interoperate together to associate data files 108 to an invoice file 102. In a particular embodiment, the invoice file 102 is retained within a repair facility computer device 111a, system 100 may obtain repair instruction files specific for the vehicle 103, such as based on make, model and/or year, from database 117 such as via a request to computer portal 115 from computer 111*a* via network 113, where the returned results are associated with the invoice file 102 and attached thereto. The repair instruction data files 108 may be automatically obtained and attached to the invoice file 102, such as upon generation of a repair order 104. Still further, separate equipment used in the repair of vehicle 103 may likewise be configured to automatically transmit data files 108 to computer 111*a*, with those data files 108 being automatically associated and attached to the respective invoice file 102. For example, a vehicle diagnostic computer tool 150 used to diagnose the electronic system of vehicle 103 may receive information regarding the repair order and/or obtain information regarding the vehicle, such as the VIN. Upon completion of a diagnostic scan, the diagnostic data is transmitted to computer 111*a* as a data scan log file that includes details regarding the repair order and/or vehicle information whereby the diagnostic data file 108 may also be linked to and automatically attached to the invoice file 102. Still further, a camera 315 may be used to take digital images of a vehicle 103, such as before and after repairs have been performed, or as setup for calibration with targets in position, or the like. The digital image data files 108 from the camera 315 may in turn be transmitted to the computer 111*a*, such as by being linked to a repair order 104 whereby the digital image data files 108 may likewise be automatically attached to the invoice file 102. Similar data files 108 from other components and equipment may be automatically attached to an invoice file 102, such as from distance sensors, wheel alignment systems, and the like. It should also be appreciated that a computer, such as repair facility computer 111*a*, may initially retain the various data files 108 prior to attaching to an invoice file 102 during repairs with the electronic invoice file 102 being generated upon completion of the repairs to the vehicle 103.

The vehicle service system may include or receive information from a vehicle diagnostic computer tool for capturing test data while the diagnostic tool is in communication with the electronic system of the vehicle. The vehicle diagnostic computer tool may also selectively retrieve the procedural documentation based upon vehicle information. The selected procedural documentation may be retrieved from a local source or a remote computer. Images may be captured by the vehicle diagnostic computer tool, some other computing device, or through some other means. The vehicle service system uploads the documentation data files 108 such as test data, images, and documents to a remote computer to generate a report documenting the repair service, which may be attached to an invoice 106 for the repair services. Such documentation may be needed by or provided to the service provider, an insurer, a vehicle owner, or the like, to document that each service procedure that was specified and approved for the repair was provided during the repair service, and was necessary and for some even mandated, for example that certain repair services were necessitated by an OEM procedure or instruction. The documentation report and invoice may be provided to a vehicle owner, a service provider, or an insurer, or another interested party. The documentation report may be provided to a vehicle repair estimating software system, or the like, such as may have been used to generate a repair order 104 specifying the services to be provided and may be used to generate an invoice 106 upon completion of the repairs.

FIG. 1 illustrates a diagram of a vehicle service system 100 in accordance with one embodiment of the present application. A vehicle 103 is delivered to a service provider

105 for repair services or testing to be done at a repair facility. For example, the repair service may be necessitated due to damage to the vehicle 103 due to a collision or other event causing damage to the vehicle 103. The service provider 105 includes a computing device 111*a* that is operable to be in selective communication with a remote computing device or portal 115 via a network 113. The portal 115 is further in communication with a database 117. In an exemplary embodiment, the database 117 contains data of its own creation or that of a third party that provided data to the portal 115. The portal 115 is configured to receive service data about the work (e.g., repair work) to be done. It is contemplated that this order data could be automated or manual in nature. When, or if, the vehicle 103 is ready, or needs a service performed, this status is shown to the service provider 105. Alternatively, the computing device 111*a* may be operable itself to, for example, generate an estimate, a work order, and an invoice, as well as attach documentation thereto without having to be in communication with a remote database 117, such as by way of having its own such database.

In one embodiment, an exemplary vehicle repair estimating system or program, such as shown in FIG. 1, includes a remote computer 180 with a vehicle estimating software 182. The estimating software 182 may be used to generate a repair order for the vehicle 103, with a resulting post-repair report being used as confirmation of completion, as well as for documenting, such as for insurance purposes. The estimating software may be, for example, provided by Audatex North America, Inc. or by Enlyte Group, LLC, such as under its MITCHELL brand of estimating software, or may be provided by CCC Intelligent Solutions, such as under its CCC brand of estimating software. The vehicle repair estimating software is configured to receive information regarding damage to a vehicle and in turn document the repairs needed for the vehicle, including providing a cost estimate based on the type of damage to the vehicle, the repair parts thus needed and associated costs thereof, and the estimated time for repair including labor costs for such repairs, such as to create a detailed invoice for a vehicle owner, insurance adjuster, or the like. As part of this, the vehicle repair estimating software 182 is operable to list or detail all the repair steps necessary, including as specified by the vehicle manufacturer, including operations such as calibration processes for which a given repair facility, or service provider is not able to perform, and thus requires assistance from another service provider. Although estimating software 182 is shown in FIG. 1 as residing at remote computer 180, it should be appreciated that estimating software 182 may alternatively reside at computer 111*a* of service provider 105, or may be accessible by computer 111*a*. As such, service provider 105 may receive or generate an electronic estimate file 102 as well as generate a repair order 104 using estimating software 182, and including generate an electronic invoice file 106 therefrom. The various files 102, 104, 106 may reside on one or both of the computer 111*a* of the service provider 105 or the remote computer 180.

As illustrated in FIG. 1, the vehicle service system 100 includes a vehicle diagnostic computer tool 150 that is operatively connectable to the electronic system 219 of the vehicle 103, where the vehicle diagnostic computer tool ("diagnostic tool") 150 may be used to provide information to a user regarding a repair service to be performed, provide the individual procedural steps to the service to be performed, confirm proper completion of each of the procedural steps, and to record test data during the repair procedures and services carried out on the vehicle 103. Such test data includes information captured from the vehicle's electronic system 219. The diagnostic tool 150 also captures repair service documentation data 108, such as, test results, reports, and selected procedural documents retrieved as the procedural steps of the repair service are performed. The data 108 from the diagnostic tool 150 may be transmitted to the computing device 111a and/or remote computer 180 for attaching to the electronic invoice file 106. For example, upon completing a successful diagnostic scan of the electronic system of vehicle 103 using diagnostic tool 150, the scan results are automatically transmitted to the computing device 111a and/or remote computer 180 and attached to the electronic invoice file 106.

Figure 2:
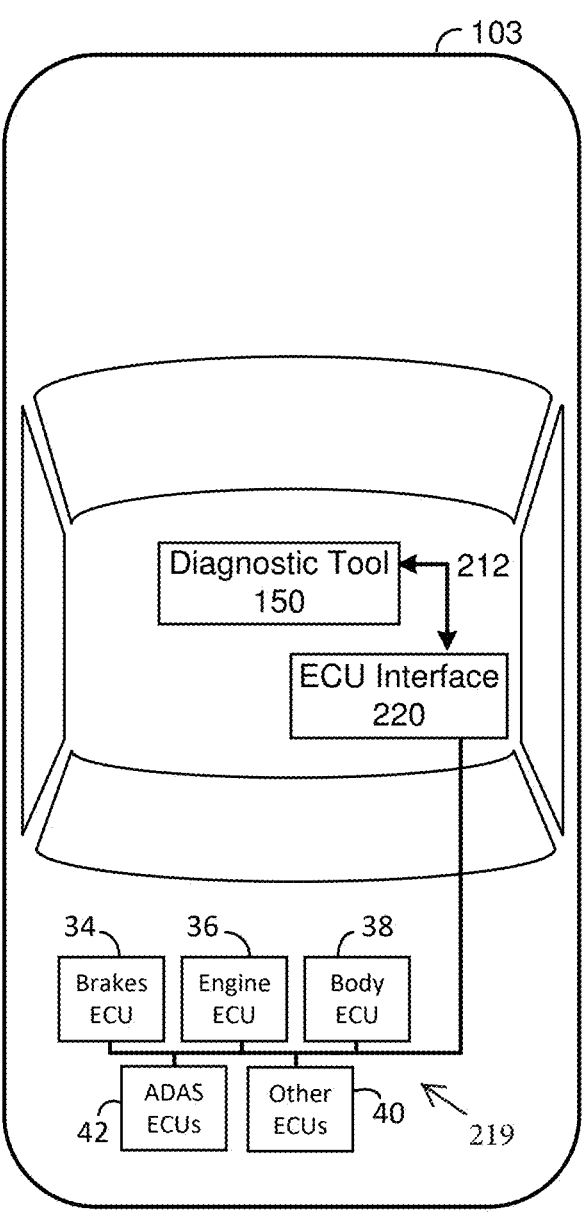
FIG. 2 is a diagram of a diagnostic tool of a vehicle service system coupled to a vehicle receiving service in accordance with the present invention.
Figure 3:
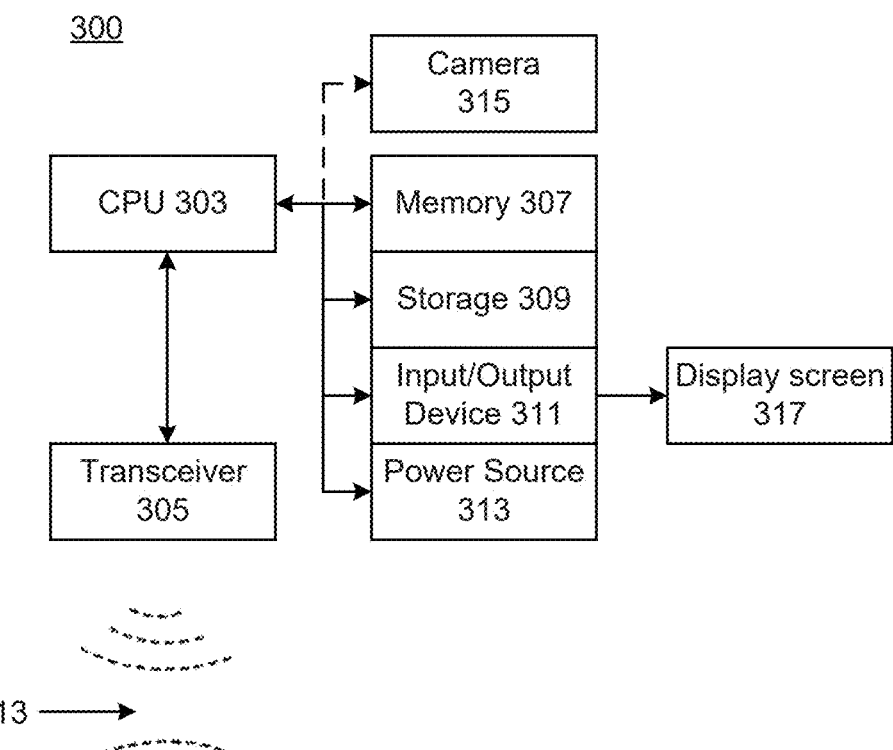
FIG. 3 is a diagram further detailing the diagnostic tool of FIG. 1 in accordance with the present invention.

The computing device 111a and/or portal 115 may be used to determine if the vehicle 103 is ready for a repair service (e.g., a calibration, an alignment, or ADAS safety system service). When the service provider 105 is ready to perform the requested and/or required service, the vehicle service system 100 is installed in the vehicle 103. As discussed herein, the diagnostic tool 150 is communicatively coupled to the electronic system 219 of the vehicle 103. While the repair service is being performed, data 107, such as images, video, performance metrics, test data, and test results is captured by the vehicle diagnostic computer tool 150 and is transmitted to the portal 115 and/or computing device 111a, with the data 107 being associated with vehicle 103 from which it was taken. As illustrated in FIGS. 1-3, the diagnostic tool 150 acquires the data 107 from the vehicle 103 and transmits the data 107 to the portal 115. As illustrated in FIG. 2, the diagnostic tool 150 is electronically coupled to the electronic control units (ECUs) of the vehicle 103. For example, in one embodiment, the diagnostic tool 150 is coupled to the electronic system 219 and vehicle ECUs via an ECU Interface 220, such as, an on-board diagnostic (OBD) diagnostic port of the vehicle 103 in order to receive test data from the various ECUs, such as an engine ECU, a body ECU, brake ECUs, and other ECUs, such as Adaptive Driver Assistance Systems ("ADAS") ECUS, and including other electronic parts and components of the vehicle 103. The diagnostic tool 150 is shown connected to the ECU interface 220 via a vehicle cable 212.

By monitoring the electronic system of the vehicle 103 (and its electronic control units (ECUs), the vehicle service system 100 provides for the monitoring and recording of test data from the vehicle during the repair services. The recorded test data may then be transmitted to a computing device 111a of the service provider 105 and/or to a remote computing device or portal 115, for confirmation, reporting and the like, including for purposes of insurance verification. To augment the test data, the vehicle service system 100 may also receive and input user/observer feedback via the manual input of data related to the performance and results of the procedural steps of the repair service.

The vehicle service system 100 provides for the selective retrieval and capture of procedural documents which are used during the repair service while procedural steps of the repair service are being carried out. The procedural documents include, for example, procedural instructions, such as, original equipment manufacturer (OEM) repair instructions and procedures, OEM alignment and/or calibration procedures and instructions, and OEM diagnostic scan documents and procedures. The procedural documents may be selectively retrieved by the diagnostic tool 150 or the computing device 111a based upon vehicle information (e.g., vehicle make, model, year, and VIN). The procedural documents may be retrieved from a local memory, from the portal 115, or some other remote source. The selected procedural documents associated with the repair services of the vehicle 103 are stored (e.g., in the memory 307 or storage 309 of the diagnostic tool 150 or stored in the database 117 by accessing the portal 115).

The vehicle service system 100 provides for the capture of images of vehicle damage, pre- and post-service images (e.g., pre-service and post-service images of setup, test equipment, and the like), and post-repair images of vehicle 103 (demonstrating the results of the repair services). The captured images may also include images of printed documents generated during the repair service (e.g., reports, test results, and other generated documents). The images may be captured by the diagnostic tool 150 or the computing device 111b (using camera 315). The images may also be captured by other means. Regardless of means, the captured images may be automatically transmitted or uploaded to computing device 111a and/or remote computing device 180 for attaching to invoice file 106. Still further, the images may be uploaded to the portal 115 to be included in the documentation that is used to generate the final report.

A user or observer can use the diagnostic tool 150 to monitor the procedural steps of the repair service as they are performed, review the procedural step results, reports, and associated documents that are generated, and to control the progress of the service (e.g., start/stop the repair service (e.g., a calibration), select a next step to perform during the repair service, and conclude the service and direct the diagnostic tool 150 to transfer the captured test data, test or procedural results, and resulting documents to the computing device 111a and/or portal 115). The diagnostic tool 150 may include an operator interface in the form of a display screen or touchscreen 317 to provide instructions and receive inputs from the user or observer. The diagnostic tool 150 can provide instructions and/or feedback to the user, such as instructions on how to perform the test or procedure of the service, including what procedural steps to take with regard to the type of service required. The instructions may be provided from the database 117, or another remote computer, or may be retained in memory of diagnostic tool 150.

The vehicle service system 100 enables an individual 109, such as a mechanic, vehicle owner, insurance representative, or the like, to be in communication with the computing device 111a and/or portal 115 via the network 113 via another computing device 111b, such as a tablet, mobile phone, laptop or other type of computer. The individual 109 is thus able to access the data 107 relative to the vehicle 103 to ensure, for example, that the service was performed, that it was completed properly, as well as to observe that the vehicle 103 was not abused or misused and that all systems, including ADAS safety systems, operate as designed. It is contemplated that the individual 109 could be the actual owner, a representative thereof, an insurance provider or representative, dealer or representative, or any other party interested in the vehicle. For example, the service provider 105 may be providing testing, calibration, or alignment services for yet another service provider that performed some repair work on vehicle 103, with individual 109 being a representative of that other service provider. Thus, the individual 109 will desire to receive documentation that demonstrates that the repair service was necessary and/or mandated by an original equipment manufacturer. As discussed herein, such documentation includes test data captured during the repair services, captured images of the vehicle, test setup, and repair service results, and selected procedural documents (e.g., printed test reports, OEM repair instructions and procedures, OEM alignment and/or calibration procedures and instructions, and OEM diagnostic scan documents and procedures) uploaded to the portal 115 during the repair service.

The vehicle diagnostic computer tool 150 may also be employed in a vehicle test drive system and method as disclosed in U.S. Pat. No. 11,373,465 and configured substantially in accordance with the vehicle computer system of U.S. Pat. No. 11,257,307 and/or the vehicle diagnostic device of U.S. Pat. No. 11,423,715, which are hereby incorporated herein by reference in their entireties. Accordingly, it should be appreciated that diagnostic tool 150 is connectable to the electronic system of the vehicle 103, such as via an OBD II port of the vehicle 103, to be in communication with the ECUs of the vehicle and obtain data therefrom.

Installing the vehicle service system 100 into the vehicle 103 includes electronically coupling the diagnostic tool 150 to the vehicle's ECU interface 220 (via vehicle cable 212) to communicate with the vehicle's ECUs and receive test data from the ECUs while the procedural steps of the service are performed.

Vehicle diagnostic computer tool 150 may additionally be configured to enable or provide remote assistance from a remote technician 124 (FIG. 1) connecting to the diagnostic tool 150, such as to observe diagnostic data or camera data, or to provide assistance or guidance in performing the procedural steps of the repair service. For example, the diagnostic computer tool 150 may include an internet interface for connecting with a remote computer via the internet. In one embodiment, for example, the remote computer may comprise the portal 115 that is accessed via the network 113. A remote technician 124 may thereby access diagnostic tool 150 via portal 115 and network 113.

It will be understood and appreciated that the vehicle service system 100 operates in an electronic environment 300 that is created and exists within the vehicle service system 100. The environment 300 includes the portal 115 in communication with the computing devices 111*a*, 111*b*, and the diagnostic tool 150 through the network 113. The computing devices 111*a*, 111*b*, and the diagnostic tool 150 include components that allow for the device or tool to operate and perform calculations to enable the system. The components include a CPU 303 that directs the remaining components such as a transmitter 305, memory 307, storage 309, input/output devices 311 and a power source 313. It will be understood that these components function in harmony to create the environment wherein the vehicle service system 100 functions. The input/output devices 311 can include keyboards and display screens for data entry and test result monitoring. Optionally, the components (of the diagnostic tool 150 and the computing devices 111*a*, 111*b*) can include a video and/or image camera 315 for recording and imaging the procedural steps of any required and/or requested service. The video camera 315 can also be configured to capture images during the service, such as to capture images of the vehicle (e.g., images depicting vehicle damage), any test or service setup, and of any printed documents generated by the procedural steps of the service which need to be documented and saved along with the data 107.

It is anticipated that there can be some differences between the components of the computing devices 111*a*, 111*b*, and the diagnostic tool 150. For example, as discussed herein, the diagnostic tool 150 may be configured with full user input and test/repair procedure monitoring/review, and data retrieval (and the necessary user input/output). The CPU 303 of the diagnostic tool 150 or the computing devices 111*a*, 111*b* may be in the form of a processor or microprocessor and include interface circuitry to facilitate communication between the ECUs and themselves, as well as with each other. Furthermore, their respective memory 307 and/or storage 309 may also include a database of vehicle protocols that allow communication with the ECUs of various makes and models of vehicles (via the diagnostic tool 150).

Referring now to FIG. 4, the interaction of the vehicle service system 100 is illustrated. It is contemplated that in an exemplary embodiment 401, that a portal interface 403 is the means whereby the service provider 105 and the individual 109 interact with the portal 115. It is contemplated that the portal interface 403 provides access to the database 405, a report module 411, data sources 409, and a video/photo storage 407. It is contemplated that the database 405 is in communication with a third-party data provider 413 wherein information relevant to the work or status of the vehicle 103 is exchanged. It is contemplated that manual data entry 415 could be used to populate data in the database 405.

The data sources 409 are contemplated to be, for example, the test data from the diagnostic tool 150 (which is coupled to the vehicle ECUs), as well as the procedural documents, which include images captured before, during, and after the repair service, as well as captured procedural documents, such as, printed test reports, OEM repair instructions and procedures, OEM alignment and/or calibration procedures and instructions, and OEM diagnostic scan documents and procedures. The data sources 409 also include the captured images data. As discussed herein, the images data is sent to the video/photo storage 407. It is contemplated that these images data could also be automated, mechanical, human operators, or the like. That is, the images data could also include other sources of images data captured during the repair service of the vehicle 103. It is also contemplated that the data sources 409 comprise, for example, test or procedure results, reports, and selected procedural documents (e.g., OEM calibration procedures and instructions, OEM diagnostic scan data and instructions, and/or OEM procedural documents), and are stored in the database 405. The documentation data sources could also be received via the document input 417 for storage in the database 405.

Figure 6:
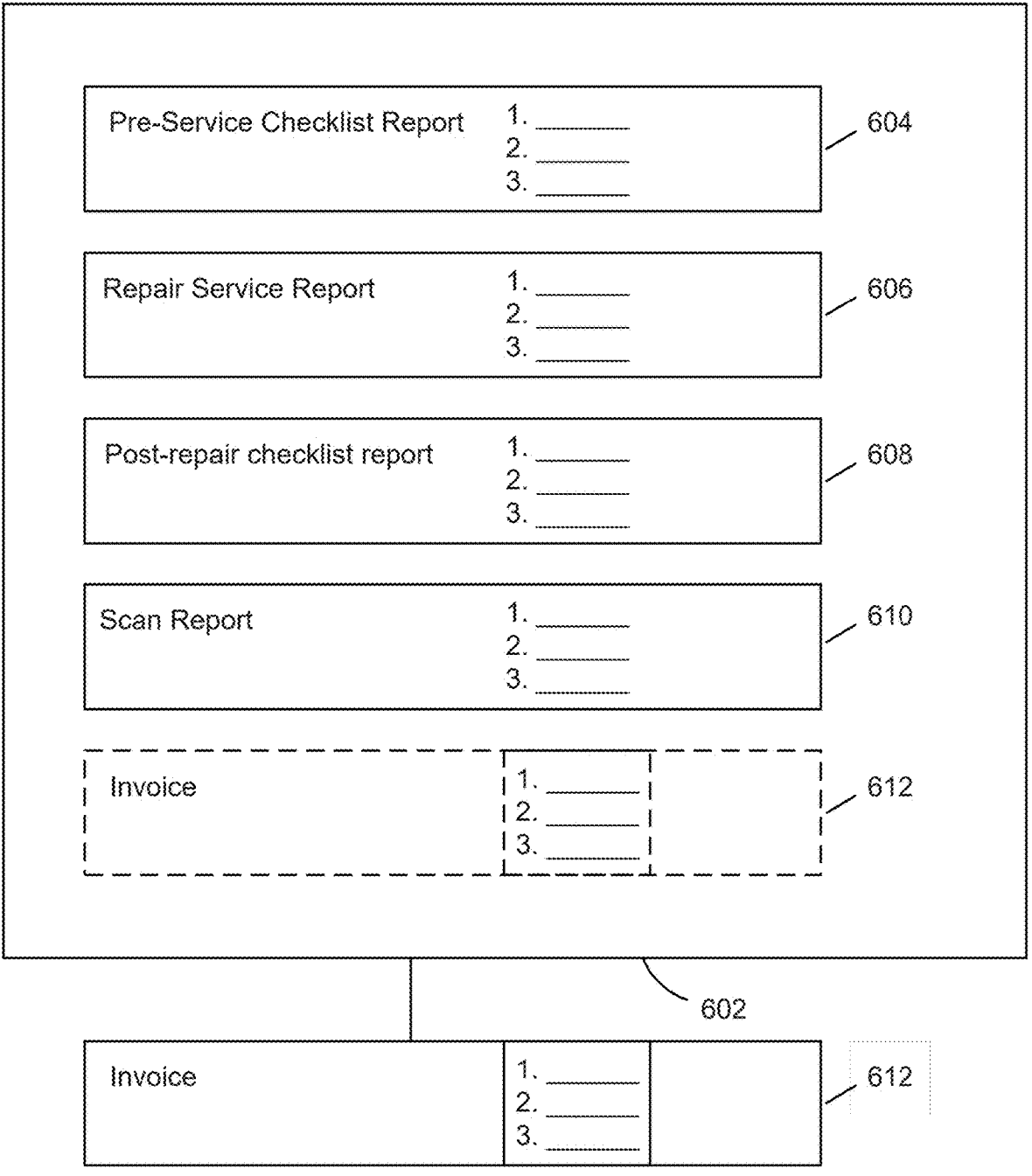
FIG. 6 is a diagram of an exemplary service report comprising a plurality of test data and document sources in accordance with the present invention.

An exemplary vehicle service system 100 provides for the attachment of selected test data, documentary images of the vehicle and repair procedures, and selected procedural documents to an invoice for a repair service (e.g., a repair, replacement, alignment, or calibration service) (see FIG. 6). As described herein, the documentary images includes images capturing service preparation, test or procedure setup, images of equipment and vehicle setup for the test or procedure, images of vehicle damages, images of the repair services, and post repair images of the vehicle. The selected test data may include test results, test reports, diagnostic reports, diagnostic scan reports and data, and other related documents. The selected procedures include, for example, repair service procedures used for the repair service, and any post-service review, checklists, and other related documents generated or captured. Such documents include, for example, original equipment manufacturer (OEM) repair, alignment, and/or calibration procedures and instructions, OEM diagnostic scan documents and procedures, and calibration results and reports. As discussed herein, the test data, images, and procedural documents are used to demonstrate that a repair service performed on the vehicle 103 was either necessary or mandated (e.g., necessitated due to OEM repair procedures and instructions). The documentation can be attached to an invoice for the service. In one embodiment, the documentation and/or a report generated from the documentation could be transmitted to the vehicle estimating software 182 of the remote computer 180 illustrated in FIG. 1. As discussed herein, the estimating software 182 may have been used to generate the repair order for the vehicle 103, with the report being used as confirmation of completion, as well as for documenting, such as for insurance purposes. The remote computing device 111a or the portal 115 can also use the data to populate and otherwise create an itemized invoice for the service rendered to the vehicle or the test drive itself.

FIG. 5 depicts the steps performed in a method 500 for performing, monitoring, and documenting the repairs and/or other services as they are performed on a vehicle 103. As discussed herein, during the repair services, diagnostic testing may be carried out using the diagnostic tool 150, which outputs test data captured from the vehicle's electronic system. As discussed herein, the requester of the service may be the owner of the vehicle 103, an insurance representative, or another service provider that provided other services (e.g., a body shop) and now needs additional services performed (e.g., calibration and/or alignment, or the like). As discussed herein, the requester of the repair service may also originate from an estimating software system. Depending on the OEM specifications and requirements, the repair service may also be considered a required or mandated repair service to meet OEM specifications and requirements.

In step 502 of FIG. 5, the vehicle 103 is validated for the repair service. Part of the preparation can include documenting the vehicle's make, model, year, VIN, and insurer, as well as confirming the procedural steps of the requested repair services conform with the OEM specification and requirements. The preparation includes selectively retrieving procedural documents based on the vehicle information (make, model, year, and VIN). The selected procedural documents may include, for example, relevant repair procedures, OEM calibration procedures and instructions, OEM diagnostic scan data and instructions, and/or OEM procedural documents for the repair services). The preparations may also include steps that provide documentation for the service provider that the vehicle 103 was ready for the service or repair, that the vehicle was in a safe condition, and that all and that all necessary safety and vehicle management steps were followed in preparing the vehicle 103 for the repair service. Such validation steps, may include, for example, a variety of vehicle safety and procedural steps. For example, the steps may include a verification that a mandated diagnostic scan before the repair was performed (and that the scan report has been uploaded to the portal 115). In step 504 of FIG. 5, the documents acquired during the vehicle validation are uploaded to the portal 115 for a final report and invoice (see FIG. 6).

In step 506 of FIG. 5, a pre-service checklist of items that need to be completed before the repair service are performed. The pre-service checklist items are performed and documented to ensure that the service provider 105 has documentation for liability and invoicing purposes to confirm what was performed. These pre-service items include documentary images of the vehicle ((e.g., of test equipment setups, printed pre-service checklists, images of the vehicle's VIN, interior images of the vehicle, exterior images of the vehicle, images of any vehicle damages, test equipment setup images, calibration or service equipment setup images, images of printed documents related to the setup, and other images to document the setup and state of the vehicle 103). The pre-service items also include any required vehicle alignment checks, identification and setup of calibration targets, verifying/emptying the vehicle contents, and identifying and setting up any other targets or equipment needed for the service (as discussed, images would be taken of any equipment setup for the repair service). The images documentation can be performed using the camera 315 of the diagnostic tool 150. Alternatively, another camera can be used and uploaded to the portal 115 via the diagnostic tool 150 or through other means (e.g., uploading via the network 113). Any required procedural documents were selectively retrieved and utilized during the pre-service checklist and recorded to document the procedure that was followed. In step 508 of FIG. 5, the test data and the procedural documents selectively retrieved and utilized during the pre-service checklist step are uploaded to the portal 115 via the network. The test data, images, and selected procedural documents may be locally stored on the diagnostic tool 150 and uploaded to the portal 115 for integration into the final report and invoice (see FIG. 6).

In step 510 of FIG. 5, the repair service procedures is performed. As described herein, using the diagnostic tool 150, while any diagnostic steps are performed, the resulting test data can be monitored and captured. The diagnostic tool 150 is thus able to monitor and document the progress of the procedural steps of the service (e.g., the diagnostic, calibration, and alignment procedures). As each procedural step of the repair service is completed, the diagnostic tool 150 may also be used to monitor and confirm via any required diagnostic scans and test programs, that the procedural steps are being carried out. The resulting reports and other documentary evidence (diagnostic scan data and reports, calibration reports and data, and the like) are uploaded to the portal 115 for integration into the final report and invoice. Required procedural documents were selectively retrieved and utilized during the repair service and recorded to document the procedural steps of the repair service. Such documents include OEM instructions and procedures, OEM diagnostic scan instructions and documents, procedural instructions, and related documents. Images is also captured to document the procedural steps of the repair service, e.g., images of the vehicle damage, images of the vehicle after the repair service, images of the test equipment and repair equipment setups, and other images used to document the procedural steps of the repair service. In step 512 of FIG. 5, the test data, images, and selected procedural documents used and/or generated during the procedural steps of the repair service are uploaded to the portal 115 for integration into the final report and invoice (see FIG. 6).

In step 514 of FIG. 5, a post-repair checklist and documentation process is performed. The post-repair checklist may include post-repair diagnostic scans, alignment procedures, and testing procedures that are monitored by the diagnostic tool 150. The diagnostic tool 150 may be used to capture test data generated during the post-repair diagnostic scans, the alignment procedures, and the testing procedures. Procedural documents retrieved and utilized during the post-repair checklist are recorded to document the procedures followed. The procedural documents for the post-repair checklist may also include OEM documents related to the vehicle and for the particular service required and/or requested. Other Post-repair images is also captured to document the procedures followed. Such images may include, for example, post-service images of the vehicle (e.g., any vehicle repairs), images of test/calibration results, images of printed documents related to the procedural steps, and final images of the test or procedural equipment. In step 516 of FIG. 5, the test data, images, and selected procedural documents generated or used during the post-repair checklist are uploaded to the portal 115 for integration into the final report and invoice.

Finally, in step 518 of FIG. 5, the test data, test results, selected documents, reports, images, and anything else generated or retrieved before, during, and after the procedural steps of the repair service were performed, and which were uploaded to the portal 115, are used to generate a final report 602. In one embodiment, the final report is a documentary report integrated or attached to an invoice 612. In one embodiment, the final report 602 is attached to the invoice. As discussed herein, the estimating software 182 may have been used to generate the invoice 612. The remote computing device 111*a* or the portal 115 can also use the data to populate and otherwise create an itemized invoice for the service rendered to the vehicle or the test drive itself.

In one embodiment, the final report 602 includes a pre-service checklist report 604, a repair service report 606, a post-repair report 608, a diagnostic scan report 610, and an invoice 612. The pre-service checklist report 604 includes the test data, reports, images, and selected procedural documents generated or retrieved during the pre-service checklist steps. The repair service report 606 includes the test data, test results, associated reports, retrieved procedural step documents, images, and supporting documents generated or retrieved during the repair service. The post-repair checklist report 608 includes the test data, reports, images, and selected procedural documents generated or retrieved during the post-repair checklist steps. The diagnostic scan reports 610 include all of the documents generated during any pre-service diagnostic scans, any diagnostic scans run during the repair service procedures, as well as from any scans run post-repair to confirm/validate the repair service. The invoice 612 includes the individual billing statements for each service procedure performed and/or for each portion or procedural step of a service performed. As discussed, the invoice 612 may also include the other components of the final report 602 (the pre-service checklist report 604, the repair service report 606, the post-repair report 608, and the diagnostic scan report 610). The final report 602 (including or attached to the invoice 612) may be stored in the database 117 and made available to an individual, such as the owner, and the service provider 105. In one embodiment, the final report 602 is separate from the invoice 610 and is attached to the invoice 610 as a separate document (see FIG. 6).

While the diagnostic tool 150, as discussed herein, conforms with the SAE J2534 standard, it should be appreciated that alternatively configured vehicle diagnostic tools may be employed (for monitoring the performance and procedural steps of a test drive) within the scope of the present embodiments, including alternatively configured tools for alternative types of vehicles, such as alternative classes of vehicles. Accordingly, an interface tool of the diagnostic tool 150 may conform with the ISO 22900 standard, or RP1210 standard, or may operate under the ELM327 command protocol.

As noted, the software and/or hardware of diagnostic tools may be required to be updated to operate with new vehicles and/or enable programming and diagnosing of existing vehicles. In the above noted embodiments, the diagnostic tool 150 may be periodically updated via an Internet connection, or may be returned to the supplier for updating, including with regard to hardware updates. This may be done by the supplier of the diagnostic tool 150, whereby the local operator need not spend time attempting to maintain the equipment.

In a further illustrated embodiment, the diagnostic tool 150 is implemented as a laptop computer with integrated monitor, keyboard, and mouse.

Thus, a repair service is monitored and documented by a vehicle service system as the repair service is performed on a vehicle. The vehicle service system captures test data from the vehicle and/or information from a user or observer while procedural steps of the repair service are being performed (e.g., diagnostic tests and diagnostic scans). The vehicle service system includes a vehicle diagnostic computer tool which is in communication with the electronic system of the vehicle. The data/information of the vehicle service system is used to provide feedback to the user or observer as the procedural steps are completed and to document all aspects of procedural steps, such as, pre-check reports, procedural step results, images captured during one or more procedural steps, the performance of specific procedural steps during the service, and the performance of the vehicle (e.g., the vehicle's ADAS systems) during the repair service. The data includes test data and test results. The vehicle service system captures images to document the repair service. Such images may include, for example, images of vehicle damage, pre- and post-service images (e.g., pre-service and post-service images of setup, test equipment, and the like), and post-repair images of the vehicle 103 (demonstrating the results of the repair services). The captured images may also include images of printed documents generated during the repair service (e.g., reports, test results, and other generated documents). The images may be captured by the diagnostic tool 150 or the computing devices 111*a*, 111*b* (using camera 315). The images may also be captured by other means. The vehicle service system also provided for the selective retrieval of procedural documents for the repair service. The selected procedural documents may include, for example, OEM repair, alignment, and/or calibration procedures and instructions, OEM diagnostic scan documents and procedures. The test data, images, and selected procedural documents are used as documentation that a repair service was necessary. The documentation may be needed by the service provider and/or an insurer, etc. to document that a repair service was necessary and/or mandated by an original equipment manufacturer. The test data, test results, reports, and procedural documents are used to generate a final report that supports and documents the repair service. The final report may be attached or integrated into an itemized invoice for the repair service.

Referring to FIGS. 1, 2, 3, 7, and 8, the vehicle service system 100 can be configured to additionally utilize captured and/or acquired diagnostic data and photo imagery to document vehicle setup and fixture/target setup before vehicle calibration or other repair procedures and the like. Such exemplary calibration and/or repair services may include, for example, an ADAS safety system repair, replacement, calibration and/or service, body work, pre- and post-service calibration diagnostic scans, test drives, calibration procedures, module programming or reprogramming, air conditioning chemistry recovery and recharging. ADAS camera and radar calibrations, and the like. With the diagnostic tool 150 communicatively coupled to the ECU interface 220 of the vehicle 103 (via cable 212), the diagnostic tool 150 can monitor and extract diagnostic data from the vehicle 103 with respect to the vehicle setup before the calibration and/or repair procedure is started. For example, the diagnostic data can include, for example, fuel level, tire pressure, and other vehicle parameters monitored by vehicle ECUs and captured from the diagnostic data. Such vehicle information is selected for monitoring and capture that is specified in the vehicle setup procedures for a particular vehicle repair and/or calibration procedure. With the monitoring and capture of the diagnostic data related to vehicle setup, the captured data can serve as documentary evidence that the related vehicle setup procedure was completed (and correctly).

Figure 7:
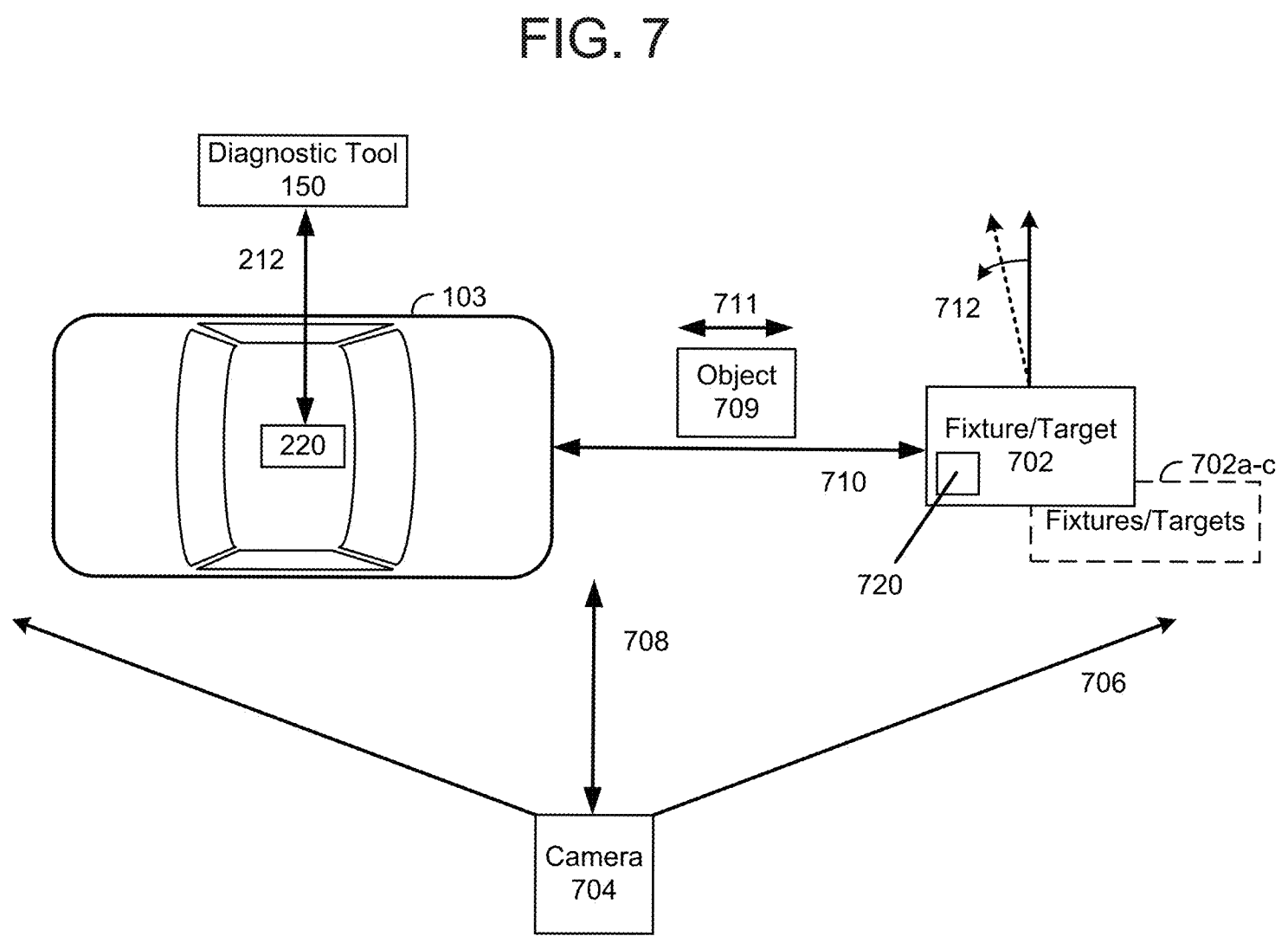

Referring to FIG. 7, a vehicle 103 in the vehicle service system 100 for one or more calibration and/or repair procedures would be positioned with respect to one or more fixtures and/or targets (a "fixture/target assembly") 702. Note that either the vehicle 103 or the fixture/target assembly 702 can be positioned with respect to each other. If there are multiple calibration and/or repair procedures to perform that require different fixtures/targets 702 (e.g., fixtures/targets 702a, 702b, 702c) or a different setup for the fixture/target assembly 702 with respect to the vehicle 103, then each change in fixture and/or target 702 (or their setup) can be separately documented as discussed herein. As also discussed herein, the fixture of the fixture/target assembly 702 can include a position sensor 720 for determining a position of the fixture/target assembly 702 with respect to the vehicle 103. The position sensor 720 can include a laser range finder, a time-of-flight range finder, and other range, position, and/or orientation sensors for determining an orientation and distance between the fixture/target assembly 702 and the vehicle 103.

With the vehicle 103 and fixture/target assembly 702 positioned, a camera 704 is positioned with respect to the vehicle 103 and the fixture/target assembly 702 and is used to capture at least one image of the vehicle 103 and the fixture and/or target 702 as they are positioned or arranged for the desired calibration and/or repair procedure. As illustrated in FIG. 7, the camera 704 is in a fixed position such that the camera 704 has a fixed field of view 706 and is sitting a fixed distance 706 from a parallel plane with respect to the vehicle 103 and the fixture and/or target of the fixture/target assembly 702. While only a single camera 704 in a single fixed position is illustrated in FIG. 7, it is understood that multiple cameras 704 in multiple fixed positions could be arranged around the vehicle 103 and the fixture/target assembly 702 (e.g., to capture different angles of the vehicle 103 and the fixture/target assembly 702). Image data and/or video data from the camera 704 is received by the diagnostic tool 150 and/or another computer device 111a, 111b, or the portal 115.

In one embodiment the camera 704 is a stand-alone device configured to capture still images and/or record videos. Such a stand-alone device can be communicatively coupled to the diagnostic tool 150. In another embodiment, the camera 704 is the camera 315 of the diagnostic tool 150. In such a configuration, the camera 315 (and diagnostic tool 150) is placed in the position as camera 704. In such a configuration the diagnostic tool 150 can either remain communicatively coupled to the vehicle 103 or temporarily separated while capturing the images and/or videos.

Based upon an object 709 with known dimensions, such as a known fixed length 711, sitting within the field of view 706 of the camera 704, the known fixed length 711 of the object 709 (in the image or video) can be used to determine the distance 710 between the vehicle 103 and the fixture/target assembly 702. That is, the calculated observed length of the object 709 in the image or video (with respect to its known length 711) is used as a basis for calculating the observed distance 710 between the vehicle 102 and the fixture/target assembly 702 (in the image or video). The diagnostic tool 150, the computer device 111a, 111b, or the portal 115 is configured to derive the distance measurement between the vehicle 103 and the fixture/target assembly 702 based upon the known dimensions of the object 709. That is, a graphical software program in the diagnostic tool, the computer devices 111a, 111b, and/or the portal 115 is configured to derive a distance between the vehicle 103 and the fixture/target 702 based upon a graphical analysis of the image data and/or video data.

The image or video can also be used to determine whether the fixture/target assembly 702 is properly oriented with respect to the vehicle 103. That is, the image captured by the camera 704 can be used to estimate an angle 712 of the fixture/target assembly 702 with respect to the vehicle 103. The expected angle is, for example, 0 degrees. That is, an expected perspective view of the fixture/target assembly 702 (e.g., a graphical silhouette or outline) is compared with the perspective view of the fixture/target assembly 702 in the image/video. Thus, the position and orientation between the vehicle 103 and the fixture/target assembly 702 can be calculated and documented with captured images and/or recorded videos (and the resultant calculations based on those captured images and/or recorded videos).

The images and/or videos can also be used to verify that the proper fixture/target assembly 702 has been positioned for the calibration and/or repair procedure. That is, the images and/or videos of the fixture and/or target itself can be used to identify whether the expected fixture/target assembly 702 is present. If the fixture/target assembly 702 is not distinguishable from other fixture/target assembly 702 (e.g., fixtures/targets 702a, 702b, 702c), then an identifying feature (e.g., a serial number or other identifying features on or about the fixture/target assembly 702) could be used to verify the identity of the fixture/target assembly 702 in the images and/or videos.

In an alternative embodiment, the fixture/target assembly 702 is configured to confirm its position (via the position sensor 720) with respect to the vehicle 103. When the fixture/target assembly 702 confirms that its position with respect to the vehicle 103 is within a specified parameter, the fixture/target assembly 702 is configured to send an indication to the diagnostic tool 150 that the fixture/target assembly 702 is in a desired position with respect to the vehicle 103. Furthermore, the fixture/target assembly 702 is also configured to indicate to the diagnostic tool 150 its configuration (i.e., what targets are equipped and/or positioned on the frame). That is, with the position sensor 720 of the fixture/target assembly 702, and its ability to determine what targets are currently equipped, the vehicle 103 and fixture/target assembly 702 can be configured without the use of a camera 704.

Thus, a user or observer can use the diagnostic tool 150 to monitor the procedural steps of a calibration and/or repair procedure as they are performed (e.g., capturing diagnostic data and image and video data during each procedural step of a vehicle setup procedure). As discussed herein, the diagnostic tool 150 can be directed to transfer the captured diagnostic data, the associated image data and/or video data, any captured procedural data or procedural results, and any resulting documents to the computing device 111a and/or portal 115. The diagnostic tool 150 may include an operator interface in the form of a display screen or touchscreen 317 to provide instructions and receive inputs from the user or observer. The diagnostic tool 150 can provide instructions and/or feedback to the user, such as instructions on how to perform the test or procedure of the service, including what procedural steps to take with regard to the type of service required. The instructions may be provided from the database 117, or another remote computer, or may be retained in memory of diagnostic tool 150.

Referring to FIG. 8, the steps to a method 800 for capturing diagnostic data and image data and/or video data to document the procedural steps of a vehicle and/or fixture/target setup. As discussed herein, during the vehicle/test equipment setup, diagnostic data from the vehicle 103 can be monitored and captured using the diagnostic tool 150, which outputs diagnostic data captured from the vehicle's electronic system.

In step 802 of FIG. 8, the vehicle is prepared for a calibration and/or repair procedure. That is, the vehicle 103 is readied according to specifications for the planned calibration and/or repair procedure. Parts of the preparation can include documenting the vehicle's fuel level, tire pressure, as well as other vehicle information that are monitored by the vehicle's electronic systems and capturable by the diagnostic tool 150. Such preparations can also include positioning the vehicle 103 and one or more fixtures/targets 702 a set distance apart and with a desired orientation between them.

In step 804 of FIG. 8, the diagnostic tool 150 is communicatively coupled to the vehicle 103 via an communications port 220 of the vehicle 103. In step 806 of FIG. 8, any remaining pre-procedures are completed. In step 808 of FIG. 8, diagnostic data from the vehicle 103 is captured by the diagnostic tool 150 before, during, and after the vehicle 103 and/or fixture/target assembly 702 setup procedures. In step 810 of FIG. 8, image data and/or video data is captured of the vehicle and fixture/target assembly setup. As discussed herein, the image data and/or video data is captured with the use of a camera 704 in a fixed, pre-arranged position with respect to the vehicle 103 and/or fixture/target assembly 702. As also noted herein, one or more cameras 704 can be used and the camera 315 of the diagnostic tool 150 can be used. The image data and video data captures the positions of the vehicle 103 and the fixture/target assembly 702 and the position of a pre-defined object 709 with a known length 711.

In step 812 of FIG. 8, measurement information is extracted from the image data and/or video data. Such measurement information can include a determined length of the object 709 (based upon its own length to define the length of the object 709 as viewed in the image data and/or video data). Using the calculated length of the object 709 as viewed in the image data and/or video data, a calculated distance 710 between the vehicle 103 and the fixture/target assembly 702 can be determined. In step 814 of FIG. 8, the positions of the vehicle 103 and fixture/target assembly 702 with respect to each other are determined based upon the calculated measurements derived from the image data and/or video data. Note that such measurement information can also include identifying marks and details captured in the image data and/or video data that can be used to determine which particular fixture/target assembly 702 is viewed in the image data and/or video data.

In step 816 of FIG. 8, after the vehicle and/or fixture/target setup is complete, a pre-service report is generated and uploaded to the computer device 111a and/or the portal 115. The pre-service report includes the diagnostic data containing the vehicle information that verifies that the vehicle 103 has been properly set up for the planned calibration and/or repair procedure. The pre-service report also includes the calculated vehicle and/or fixture/target positions and orientations as well as the image data and/or video data the calculations and determinations are based upon. The pre-service report can also include procedural documents selectively retrieved and utilized during the setup procedures. Such documents include OEM instructions and procedures, OEM diagnostic scan instructions and documents, procedural instructions, and related documents.

Figure 10:
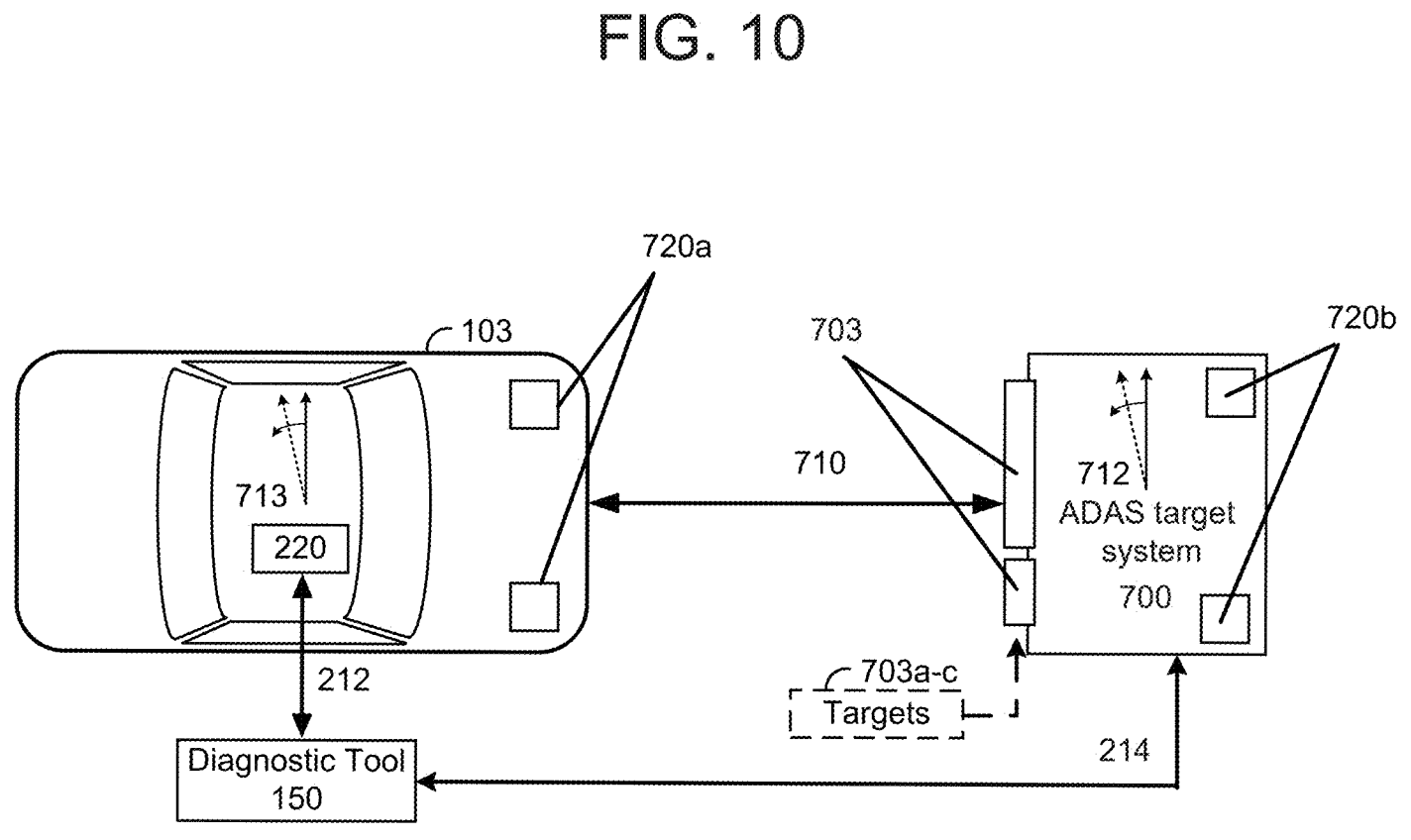

Referring to FIG. 10, a vehicle 103 in the vehicle service system 100 for one or more calibration and/or repair procedures would be positioned with respect to a vehicle advanced driver assist system (ADAS) target system or stand 700 configured to hold one or more ADAS targets 703a, 703b, 703c. The ADAS targets 703 can be, for example, optical pattern targets for viewing by cameras, or can be physical targets, such as reflectors, trihedral targets, and the like for use with RADAR and LiDAR sensor systems, or other such targets for other ADAS sensors. Note that either the vehicle 103 or the ADAS target system 700 can be positioned with respect to each other. The ADAS target system 700 is configured for use in aligning ADAS targets with vehicle and ADAS vehicle sensors for calibration of the vehicle sensors. The ADAS target system 700 may be a conventional device comprising a fixture and target holders for holding and positioning targets 703. The system 700 may include actuators, position encoders and the like for positioning the targets and providing position, location or orientation data regarding the target 703, including relative to the stand 700, with the stand 700 in turn providing position data relative to the vehicle 103 whereby the position of the target 703 relative to the vehicle 103 can be established. Various types of position information can be obtained for aligning the ADAS target 703 and/or the ADAS target system 700 with the vehicle 103, including position sensors 720a, 720b, such as time of flight, laser reflective, or other position sensors. As illustrated in FIG. 10, the position sensors 720a, 720b can be mounted to the vehicle 103 and/or the ADAS target system 700 (e.g., pairs of sensors 720a, 720b could be used in combination). Based upon position information (e.g., distance and alignment measurements) from the position sensors 720a, 720b, either the vehicle 103 and/or the ADAS target system 700 (or equipped targets 703) can be positioned into proper alignment for calibration of the ADAS vehicle sensor(s) using the interconnected equipped diagnostic tool 150 and ADAS target system 700. Such alignments can be by moving the ADAS target system 700 and/or the equipped targets 703 laterally, longitudinally, vertically, and/or rotationally about a vertical axis 712 relative to the vehicle 103 (i.e., and its vertical axis 713) and its equipped ADAS sensor(s). If there are multiple ADAS sensor calibration, diagnostic, and/or repair procedures to be performed, multiple targets 703a, 703b, 703b can be removed and replaced, and/or different setups for the ADAS target system 700 (e.g., equipped targets 703 shifted in position) with respect to the vehicle 103 may be required, with each separately documented as discussed herein.

As illustrated in FIG. 10, the diagnostic tool 150 and the ADAS target system 700 are communicatively coupled via a communications link 214. The communications link 214 can be a wired link or a wireless link. The communications link 214 between the ADAS target system 700 and the diagnostic tool 150 provides for two-way communications between the ADAS target system 700 and the diagnostic tool 150. Communications, such as commands, may be transmitted wirelessly or wired, including such as to the Internet or local network and to the ADAS target system, diagnostic tool 150 and/or the electronic system 219 of vehicle 103. For example, the diagnostic tool 150 may be used to provide commands to the target system 700 for positioning the target 703 or selecting a different target 703. Diagnostic tool 150 may also be used to perform diagnostic repairs to electronic system 219, such as for clearing faults or reprogramming electronic system 219, or portions thereof.

Using the communications link 214, the ADAS target system 700 provides the diagnostic tool 150 with feedback concerning any pending or on-going procedures (e.g., ADAS calibrations). For example, the diagnostic tool 150 is used to read vehicle information and related diagnostic data in preparation for a procedure (e.g., diagnostic, repair, or calibration procedures, and the like). Such vehicle information and diagnostic data can include vehicle year, make, model, VIN, tire pressure, fuel level, steering angle(s), wheel alignment information, and active suspension information. The diagnostic tool 150 can also be used to read diagnostic data streams and fault codes (e.g., during a diagnostic scan). For example, as illustrated in FIGS. 2 and 10, when communicatively coupled to the vehicle 103 (via the ECU interface 220), the diagnostic tool 150 is configured to query a variety of vehicle ECUs, such as brake ECU 34, engine ECU 36, body ECU 38, other ECUs 40, ADAS ECUs 42, and a GPS sensor 44. Such ECUs can receive and report data from sensors of the vehicle, such as fuel sensors, tire pressure sensors, steering angle sensors, wheel alignment sensors and active suspension sensors, each configured to output sensor signals that are received and evaluated by the diagnostic tool 150, for example for comparing tire pressure sensor signals, fuel level sensor signals, steering wheel angle sensor signals and the like, are within predetermined limits for calibration of vehicle sensors. The diagnostic tool 150 is also configured to confirm that there are no fault codes in the electronic system of the vehicle 103, such as from the ADAS ECUs 42, that would prevent calibration of the ADAS sensor. Note that such a review of ADAS sensors and/or ADAS ECUs 42 can also include the diagnostic tool 150 determining an inventory of those ADAS sensors in the vehicle, such as disclosed in the vehicle diagnostic system and method for guided vehicle scanning for ADAS system components, as disclosed in U.S. patent application Ser. No. 17/515,516, filed on Oct. 31, 2021, which is hereby incorporated herein by reference in its entirety. Lastly, a review of vehicle ECUs during a pre-procedure review can include a review of GPS sensor output signals (e.g., GPS coordinates) to confirm that the vehicle 103 is in a suitable location for a sensor calibration (e.g., service provider 105). That is, not in a parking lot with an unleveled surface. Thus, the GPS sensor 42 is sufficiently sensitive enough to generate highly accurate GPS coordinates to confirm the location of the vehicle 103.

In addition to the above information from the vehicle 103, the diagnostic tool 150 can also receive ADAS target data information from the ADAS target system 700 itself. For example, in an aspect of the present embodiment, an exemplary ADAS target system 700 provides location data and position indications of the ADAS target system 700 with respect to the vehicle 103. For example, the position/location data can provide information concerning the orientation and placement of the ADAS target system 700 with respect to the vehicle 103 and/or a confirmation from the ADAS target system 700 that the ADAS target system 700 and/or equipped target(s) 703 are correctly positioned with respect to the vehicle 103. Optionally, the location data can include an indication as to whether the floor (upon which the ADAS target system 700 is placed) is level. Exemplary floor leveling information can include, for example, an output signal from a digital level sensor indicating that the floor is level. In an aspect of the present invention, such position and orientation indications can be provided via sensor signals from the position/orientation sensor 720a, 720b on the ADAS target system 700 and/or the vehicle. Such sensor signals from the position/orientation sensors 720a, 720b can be used by the ADAS target system 700 and/or the interconnected diagnostic tool 150 to determine whether the ADAS target system 700 is within a specified distance from the vehicle 103. In a similar manner, an output signal from the orientation/position sensors 720a, 720b can also be used to confirm that the ADAS target system 700 is within a specified orientation with respect to the vehicle 103. For example, pairs of orientation/position sensors 720a. 720b on each of the ADAS target system 700 and the vehicle 103 can be used to confirm the orientation between the ADAS target system 700 and the vehicle 103. Such orientation and positioning sensors are well known in the art, as well as their methods for determining distances between pairs of sensors or targets and determining orientations between objects (e.g., ADAS targets and vehicles).

In an aspect of the present embodiment, the ADAS target system 700 is configured to read target part numbers or other indications of the particular target (e.g., targets 703a, 703b, 703c) on the ADAS target system 700, such as by radio frequency identification (RFID) tags. It should be appreciated that different targets may be needed for calibration of different sensors on different makes and models of vehicles. Accordingly, for example, system 700 may include a plurality of targets (e.g., targets 703a, 703b, 703c) and the ADAS target system 700 can read a corresponding part number for the particular target (e.g., target 703b) mounted thereon and report the target information for target 703b to the diagnostic tool 150. In an aspect of the present embodiment, when a different target (e.g., target 703c) is placed onto the ADAS target system 700, the ADAS target system 700 can read the part number of the replacement target (target 703c) and update its current target information related to the identity of the current target set up for an anticipated procedure. In this way, diagnostic tool 150 can monitor the part number of the target 703 to ensure that the correct target for the sensor of the vehicle is being used. The ADAS target system 700 is also configured to determine a current target setup (any alignment or configuration of the target 703 and ADAS target system 700) and to report this target setup (and any updates of such) to the diagnostic tool 150.

As discussed herein, the vehicle information and diagnostic data monitored by the diagnostic tool 150, as well as the target information received by the ADAS target system 700 (via communications link 214) can be uploaded to a local computer memory or other similar computer storage means, e.g., a computer server. Such information and data from the diagnostic tool 150 and the ADAS target system 700 can be used to document the setup of the vehicle 103 and the ADAS target system 700 (and its targets 703a, 703b, and/or 703c) for a procedure.

Referring to FIG. 9, the steps to a method 900 for aligning a vehicle 103 to an ADAS target system 700 begins in step 902 where the vehicle 103 is prepared for the procedure including a list of pre-procedure tasks. Such tasks can include, for example, setting the vehicle's fuel level to a required quantity of fuel, adjusting tire pressures to a specified tire pressure, and adjusting a steering wheel position to a required steering angle, and the like. Along with such adjustments or setups, a diagnostic tool 150 is communicatively coupled to the electronic system 219 of vehicle 103 and configured to monitor vehicle information and diagnostic data, such as sensor signals associated with engine ECUs 36 and other ECUS 40, that can include, for example, fuel level sensor signals, tire pressure sensor signals, steering wheel angle sensor signals, and active suspension sensor signals. Such pre-procedure tasks can also include a diagnostic scan of equipped ADAS sensors and/or their ECUs 42 (e.g., cameras, laser sensors, Lidar sensors, radar sensors, and the like) to determine whether the equipped ADAS sensors are functioning properly (e.g., whether there are any fault codes associated with any of the ADAS sensors). As discussed herein, the diagnostic tool 150 is also configured to determine what ADAS systems and/or sensors are equipped on the vehicle 103.

In step 904 of FIG. 9, the diagnostic tool 150 is connected to the electronic system 219 of vehicle 103. Once coupled to the vehicle 103, the diagnostic tool 150 is configured to receive data, such as diagnostic data, and transmit data between electronic system 219, such as to monitor sensor signals and thereby confirm that, for example, the fuel level sensor signals, the tire pressure sensor signals, and the steering wheel angle sensor signals are within predetermined limits for calibration of vehicle sensors (e.g., ADAS sensors). Other similar vehicle parameters can also be monitored via the diagnostic tool 150 (i.e., those vehicle parameters, sensor signals, ECU fault codes, etc., that can be monitored with the diagnostic tool 150). In step 906 of FIG. 6, the specified vehicle parameters are adjusted and monitored via the diagnostic tool 150 until the pre-procedure setup is complete (and the specified vehicle parameters have been met). Note that such verification of the pre-procedure setup may include a review of GPS sensor output signals to confirm that the vehicle 103 is properly positioned for the requested calibration. For example, as discussed herein, the GPS sensor output signals can be used to determine the location of the vehicle 103 and confirm that the vehicle 103 is located in the service provider (e.g., service provider 105) and is ready for sensor calibration. That is, confirming that the vehicle 103 is not in a parking lot or unleveled surface.

In step 908 of FIG. 6, a position and alignment between the vehicle 103 and an ADAS target system 700 is performed. While this positioning and alignment is being carried out, the vehicle information and related diagnostic data is being monitored by the diagnostic tool 150. In addition to the vehicle information and the diagnostic data received by the diagnostic tool 150 concerning the vehicle 103, the ADAS target system 700 will also send position and alignment information to the diagnostic tool 150. Such position and alignment information can be determined by position and alignment sensors 720a, 720b positioned on the vehicle 103 and/or ADAS target system 700 (FIG. 10). In one embodiment, the position and alignment measurements are sent by the ADAS target system 700 to the diagnostic tool 150 for technician review. In an alternative embodiment, the ADAS target system's position and alignment sensor 720a, 720b is configured to indicate to the diagnostic tool 150 when the ADAS target system 700 is in a specified position and alignment with respect to the vehicle 103. Once the vehicle alignment procedures are completed, the method will continue to step 910 of FIG. 9. Diagnostic tool 150 may provide information to a user, such as a mechanic at a repair facility, regarding the status of the calibration setup of the vehicle 103 and target system 700 based on the vehicle data received by diagnostic tool 150 from electronic system 219 and based on the ADAS target data from ADAS target system 700, where such information provided to the user may be provided by way of a display screen on the diagnostic tool 150. The information provided to the user may be a confirmation indication that an ADAS sensor of the vehicle is ready to be calibrated and/or may be an indication of any issues that require addressing prior to performing the calibration, such as an indication that a given parameter of the vehicle, such as fuel level, tire pressure, steering angle, are not in specification, or that the target 703 is not in position, or an improper target 703 is mounted on the ADAS target system 700. It should be appreciated that specifications for performing a calibration procedure are set for various such parameters, such as specifications provided by a vehicle original equipment manufacturer (OEM). The specifications would include specifics of the target 703 to be used for calibration of a given ADAS sensor on the vehicle, parameters or limits for the positioning of such target 703 relative to the vehicle 103, and status of the vehicle 103 itself, such as with regard to tire pressure, fuel level, steering wheel position, and the like.

In step 910 of FIG. 10, the procedure (e.g., a sensor calibration) is initiated via the diagnostic tool 150, which may involve running calibration software resident in ECUs of vehicle 103, or running calibration software stored in memory of diagnostic tool 150. Diagnostic tool 150 may be configured to prevent the calibration procedure from being initiated, performed or run if data from both vehicle 103 and target system 700 are not within predefined limits or specifications. For example, with respect to data from target system 700, the calibration procedure may not proceed if the position of the target 703 relative to the vehicle 103 is not within specification, or if the part number of the target 703 part is not correct for the given sensor being calibrated of the make, model and/or year of vehicle 103. Similarly, with respect to data from electronic system 219, the calibration procedure may not proceed if any of the sensor signal data from tire pressure sensor signals, steering wheel angle sensor signals, and active suspension sensor signals, or fuel level signals. As discussed herein, while the procedure is being performed on the vehicle 103 using the ADAS target system 700, the diagnostic tool 150 will be monitoring the test, calibration, and/or repair procedure. In an aspect of the present embodiment, the diagnostic tool 150 is configured to control or provide input to the test, calibration, and/or repair procedure by monitoring diagnostic data out of the vehicle 103 and providing user feedback (via, e.g., an interaction with a touch screen 317 of the diagnostic tool 150). In step 912 of FIG. 9, the diagnostic tool 150 can reach a point in the procedure where a setup change for the ADAS target system 700 needs to be made. For example, the currently equipped targets 703a might need to be replaced with another set of targets (e.g., target 703c). As part of this setup adjustment, vehicle information and diagnostic data from the vehicle 103 (via the diagnostic tool 150) can be received along with position and orientation information from the ADAS target system 700, along with an indication from the ADAS target system 700 of what targets (e.g., targets 703c) have been setup and the overall setup of the ADAS target system 700.

In step 914 of FIG. 9, with the procedure setup adjustment complete from step 912, the test, calibration, and/or diagnostic procedure will continue. In step 916 of FIG. 16 of FIG. 9, the vehicle information and diagnostic data from the diagnostic tool 150, along with the position and orientation information from the ADAS target system 700 is saved to document the setup procedures. Such setup procedural data can also include target information from the ADAS target system 700 that identifies which target(s) (e.g., targets 703a, 703b, 703c) are equipped on the ADAS target system 700.

Thus, a vehicle 103 can be prepared for a procedure (e.g., an ADAS calibration, diagnostic scan, or repair, or any other device calibrations, and diagnostic or repair procedures) where the vehicle 103 is prepared, and then positioned and aligned with respect to the ADAS target system 700, and with the setup, positioning, and alignment documented to confirm pre-procedure requirements. As discussed herein, the ADAS target system 700 includes a position sensor 720*a*, 720*b* for determining distance and orientation between the vehicle 103 and the ADAS target system 700. The ADAS target system 700 and a diagnostic tool 150 used to monitor vehicle data during the procedure are communicatively coupled.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of performing a vehicle advanced driver assist system (ADAS) calibration service operation with a vehicle diagnostic computer tool, the method comprising:

positioning a vehicle relative to an ADAS target system for calibrating a vehicle sensor on the vehicle, wherein the ADAS target system comprises an ADAS target stand that is configured to support an ADAS target for use in calibrating the vehicle sensor;

communicatively coupling the vehicle diagnostic computer tool to an electronic system of the vehicle;

obtaining with the vehicle diagnostic computer tool vehicle data from the electronic system of the vehicle;

receiving at the vehicle diagnostic computer tool ADAS target data from the ADAS target system, wherein the ADAS target data received by the vehicle diagnostic computer tool comprises position information of the ADAS target system with respect to the vehicle; and evaluating with the diagnostic computer tool the vehicle data and the ADAS target data relative to specifications for performing the ADAS calibration service operation.

2. The method of claim 1, further comprising confirming with the vehicle diagnostic computer tool that the vehicle and ADAS target system are configured for undergoing an ADAS calibration of the vehicle sensor based upon the vehicle data and the ADAS target data.

3. The method of claim 1, further comprising providing with the vehicle diagnostic computer tool calibration status information to a user of the diagnostic tool based on the vehicle data and the ADAS target data relative to the specifications for performing the ADAS calibration service operation.

4. The method of claim 1, wherein the vehicle data comprises at least one of VIN, year, make, and model of vehicle, and wherein the ADAS calibration service operation is defined by the vehicle data.

5. The method of claim 1, wherein the vehicle data comprises at least one of a tire pressure sensor signal, a fuel level sensor signal, a steering angle sensor signal, and active suspension sensor data.

6. The method of claim 5, wherein said evaluating with the vehicle diagnostic computer tool further comprises confirming that the tire pressure sensor signals, fuel level sensor signals, and/or steering wheel angle sensor signals are within predetermined limits.

7. The method of claim 1, wherein the vehicle data comprises diagnostic data from the electronic system of the vehicle, and wherein said evaluating with the vehicle diagnostic computer tool further comprises confirming that there are no diagnostic fault codes preventing performing the ADAS calibration service operation.

8. The method of claim 1, wherein the ADAS target data comprises position information of the ADAS target stand and/or ADAS target relative to the vehicle.

9. The method of claim 8, wherein said evaluating with the diagnostic computer tool further comprises confirming that the position information of the ADAS target stand and/or ADAS target relative to the vehicle are within predetermined limits.

10. The method of claim 1, wherein the ADAS target is installed on the ADAS target stand, wherein the ADAS target data comprises an identification of the ADAS target installed on the ADAS target stand, and wherein said evaluating with the vehicle diagnostic computer tool further comprises confirming that the installed ADAS target is correct for use in performing the ADAS calibration service operation.

11. The method of claim 1, wherein the vehicle data comprises an identification of ADAS systems on the vehicle, and wherein the ADAS calibration is performed on at least one of the ADAS systems on the vehicle.

12. The method of claim 1, wherein at least one of the vehicle data and the ADAS target data comprise a GPS coordinate location.

13. The method of claim 1, further comprising generating a pre-procedure setup report that comprises the vehicle data and the ADAS target data to document conformity with the specifications.

14. A vehicle service system for performing a vehicle advanced driver assist system (ADAS) calibration service operation with a vehicle diagnostic computer tool, the system comprising:

an ADAS target system comprising an ADAS target stand and an ADAS target positioned relative to a vehicle for calibrating a vehicle sensor on the vehicle, wherein the ADAS target is configured for use in calibrating the vehicle sensor;

wherein the vehicle diagnostic computer tool is communicatively coupled to an electronic system of the vehicle;

wherein the vehicle diagnostic computer tool is configured to obtain vehicle data from the electronic system of the vehicle;

wherein the vehicle diagnostic computer tool is configured to receive ADAS target data from the ADAS target system, wherein the ADAS target data received by the vehicle diagnostic computer tool comprises position information of the ADAS target system with respect to the vehicle; and wherein the vehicle diagnostic computer tool is configured to evaluate the vehicle data and the ADAS target data relative to specifications for performing the ADAS calibration service operation.

15. The vehicle service system of claim 14, wherein the vehicle diagnostic computer tool is configured to confirm that the vehicle and the ADAS target system are configured for undergoing an ADAS calibration of the vehicle sensor based upon the vehicle data and the ADAS target data.

16. The vehicle service system of claim 14, wherein the vehicle data comprises at least one of VIN, year, make, and model of vehicle, and wherein the ADAS calibration service operation is defined by the vehicle data.

17. The vehicle service system of claim 14, wherein the vehicle data comprises at least one of a tire pressure sensor signal, a fuel level sensor signal, a steering angle sensor signal, and active suspension sensor data, and wherein the vehicle diagnostic computer tool is configured to confirm that the tire pressure sensor signals, fuel level sensor signals, and/or steering wheel angle sensor signals are within predetermined limits.

18. The vehicle service system of claim 14, wherein the vehicle data comprises diagnostic data from the electronic system of the vehicle, and wherein the vehicle diagnostic computer tool is configured to evaluate the diagnostic data to confirm that there are no diagnostic fault codes that would prevent performing the ADAS calibration service operation.

19. The vehicle service system of claim 14, wherein the ADAS target data comprises position information of the ADAS target stand and/or ADAS target relative to a vehicle to be serviced, and wherein the vehicle diagnostic computer tool is configured to evaluate whether the position of the ADAS target stand and/or ADAS target based on the position information are within predetermined limits.

20. The vehicle service system of claim 14, wherein the ADAS target is installed on the ADAS target stand, wherein the ADAS target data comprises an identification of the ADAS target installed on the ADAS target stand, and wherein the vehicle diagnostic computer tool is configured to evaluate whether the installed ADAS target is correct for use in performing the ADAS calibration service operation.

\* \* \* \* \*